United States Patent
Rajab et al.

(10) Patent No.: US 11,808,840 B2
(45) Date of Patent: Nov. 7, 2023

(54) REAL-TIME LOCATION SENSING SYSTEM

(71) Applicant: NODENS MEDICAL LTD., London (GB)

(72) Inventors: Khalid Rajab, London (GB); Rishi Das Gupta, London (GB); Peter Alizadeh, London (GB)

(73) Assignee: NODENS MEDICAL LTD., London (GB)

( * ) Notice: Subject to any disclaimer, the term of this patent is extended or adjusted under 35 U.S.C. 154(b) by 108 days.

(21) Appl. No.: 16/611,580

(22) PCT Filed: May 8, 2018

(86) PCT No.: PCT/GB2018/051230
§ 371 (c)(1),
(2) Date: Nov. 7, 2019

(87) PCT Pub. No.: WO2018/206934
PCT Pub. Date: Nov. 15, 2018

(65) Prior Publication Data
US 2020/0200892 A1 Jun. 25, 2020

(30) Foreign Application Priority Data
May 8, 2017 (GB) .................................... 1707294

(51) Int. Cl.
*G01S 13/72* (2006.01)
*G01S 5/02* (2010.01)
(Continued)

(52) U.S. Cl.
CPC .......... *G01S 13/726* (2013.01); *G01S 5/0284* (2013.01); *G01S 7/352* (2013.01); *G01S 13/341* (2013.01);
(Continued)

(58) Field of Classification Search
CPC .... G01S 13/726; G01S 13/341; G01S 13/536; G01S 13/584; G01S 13/753; G01S 13/82;
(Continued)

(56) References Cited

U.S. PATENT DOCUMENTS

| | | | |
|---|---|---|---|
| 7,916,066 B1 * | 3/2011 | Osterweil | A61B 5/1117 342/28 |
| 9,599,702 B1 | 3/2017 | Bordes et al. | |

(Continued)

FOREIGN PATENT DOCUMENTS

WO 2016/204641 A1 12/2016

OTHER PUBLICATIONS

International Search Report, dated Oct. 17, 2018, issued in International Application No. PCT/GB2018/051230.

*Primary Examiner* — Timothy X Pham
(74) *Attorney, Agent, or Firm* — Saul Ewing LLP

(57) ABSTRACT

There is provided a mmWave RTLS (Real-Time Location Sensing) system for detecting the presence of one or more objects. The system includes multiple anchors. Each anchor includes a mmWave radar subsystem that uses radar algorithms to detect one or more objects and determine the one or more location-based objects characteristics. The location-based object characteristics include one or more of the following: range, direction-of-arrival, velocity, absolute position, or logical position, each determined relative to one or more anchors.

23 Claims, 13 Drawing Sheets

(51) Int. Cl.

| | |
|---|---|
| *G01S 7/35* | (2006.01) |
| *G01S 13/34* | (2006.01) |
| *G01S 13/536* | (2006.01) |
| *G01S 13/58* | (2006.01) |
| *G01S 13/82* | (2006.01) |
| *G01S 13/87* | (2006.01) |
| *G01S 13/88* | (2006.01) |
| *G01V 15/00* | (2006.01) |

(52) U.S. Cl.
CPC .......... *G01S 13/536* (2013.01); *G01S 13/584* (2013.01); *G01S 13/82* (2013.01); *G01S 13/878* (2013.01); *G01S 13/88* (2013.01); *G01V 15/00* (2013.01); *G01S 7/358* (2021.05)

(58) Field of Classification Search
CPC ...... G01S 13/878; G01S 13/88; G01S 5/0284; G01S 7/003; G01S 7/352; G01S 7/412; G01S 7/42; G01S 2007/358; G01S 7/358; G01V 15/00

See application file for complete search history.

(56) References Cited

U.S. PATENT DOCUMENTS

| | | | |
|---|---|---|---|
| 10,909,576 B1* | 2/2021 | Arivukkarasu | G06Q 30/0269 |
| 2007/0024488 A1* | 2/2007 | Zemany | G01S 13/888 342/22 |
| 2008/0270172 A1* | 10/2008 | Luff | G06Q 30/02 342/146 |
| 2009/0303100 A1* | 12/2009 | Zemany | G01S 13/888 342/28 |
| 2013/0120365 A1* | 5/2013 | Lee | G06F 3/011 345/419 |
| 2014/0210660 A1* | 7/2014 | Larose | G01S 13/08 342/146 |
| 2015/0077282 A1* | 3/2015 | Mohamadi | G01S 1/02 342/450 |
| 2016/0363648 A1* | 12/2016 | Mindell | G01S 7/003 |
| 2017/0031005 A1 | 2/2017 | Jaeger et al. | |
| 2017/0102457 A1* | 4/2017 | Li | G01S 7/35 |
| 2017/0213087 A1* | 7/2017 | Chen | G06V 20/42 |
| 2017/0328997 A1* | 11/2017 | Silverstein | G01S 13/765 |
| 2018/0365975 A1* | 12/2018 | Xu | G08B 13/08 |
| 2019/0206142 A1* | 7/2019 | Ohashi | A63F 13/213 |
| 2019/0212429 A1* | 7/2019 | Yamanouchi | G01S 13/584 |
| 2019/0319361 A1* | 10/2019 | Kirino | H01Q 21/0031 |
| 2019/0327124 A1* | 10/2019 | Lai | H04B 1/38 |

* cited by examiner

Meta-atom 2

Meta-atom 1

Metamaterial composed of meta-atom 1 and meta-atom 2

REAL-TIME LOCATION SENSING SYSTEM

CROSS REFERENCE TO RELATED APPLICATIONS

This application claims the priority of PCT/GB2018/051230, filed on May 8, 2018, which claims priority to GB Application No. GB1707294.3, filed May 8, 2017, the entire contents of each of which being fully incorporated herein by reference.

BACKGROUND OF THE INVENTION

1. Field of the Invention

The field of the invention relates to Real-Time Location Sensing (RTLS) systems and methods to detect and track one or more objects.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Demand for inpatient services is growing as the population ages. This has resulted in increasing waiting times in A&Es across the UK and in rising waits for elective care (especially non-urgent surgery).

In addition, the number of beds in UK hospitals has been declining steadily for the last 20 years. As beds occupancy has been rising, increasing the number of beds is challenging in terms of capital expense and due to operational constraints such as staffing. The need to maintain staffing ratios per patient, together with shortages in the number of trained nurses in the UK means that increasing the number of beds in NHS hospitals is impractical in the short term (and requires additional training and staff costs in the longer term).

Efforts to improve the utilisation of beds i.e. reduce the length of stay of patients within the hospital represent both an efficiency benefit as well as a quality benefit through reduced complication rates (e.g. hospital acquired infection). There is a growing body of evidence indicating that patients whose hospital stays are shorter recover more quickly and avoid a phenomenon known as 'decompensation' which occurs when the hospital stays are longer (this effect is particularly marked in elderly patients or those with long-term medical conditions) and is observable in periods of as little as 72 hours.

Location sensing in NHS hospitals using RTLS (Real-Time Location Sensing) systems can free up resources and lower costs through improved efficiency and patient flow. It can be used for a wide array of applications such as asset tracking, monitoring patient care, and tracking infectious disease spreads. An RTLS system typically includes: (i) a means to track assets (patients, staff, equipment), most usually using tags, and; (ii) a number of anchors, which are fixed units intended to detect the presence and location of tags, and; (iii) a command/control centre which includes a database of tracked assets, their location and relevant information, and all relevant processing and decision-making algorithms, and capabilities to communicate to end-users (hospital staff and analysts).

The primary characteristics of a system are: location tracking accuracy; tag type (active or passive); polling rate (continuous, or less frequent real-time tracking); cost. A variety of current RTLS technologies for indoor tracking of assets are now described:

Wi-Fi position systems (WiPS/WFPS) use received signal strength indicators (RSSI) to estimate a device's location through knowledge of existing Wi-Fi hotspots. While this method may be straightforward to implement as it uses existing Wi-Fi infrastructure, it nevertheless suffers from large inaccuracies due to the complexity of the Wi-Fi signal and propagation characteristics, and because Wi-Fi beacons have low priority in the layer stack; so precision is typically as poor as ~10 m, and frequently worse. The very narrow channel bandwidths available, in conjunction with the heavy usage of these bands fundamentally restricts the ability to improve performance through signal processing methods. Furthermore, the tracked assets must actively broadcast their location, which increases the cost and complexity of tags (or alternatively necessitates the need for a user to have a Wi-Fi-enabled device, such as a smartphone).

Bluetooth low energy (BLE) beacons make use of the development of low energy transmit-only devices that were incorporated into the Bluetooth 4.0 standard. These beacons send out identifying and other relevant information, but do not waste power on listening for other devices (and therefore do not require pairing). While they do—by design—require active tags, their low energy consumption allows tag battery life measured in months. However as with WiPS, and for similar reasons, they currently suffer from poor positioning resolutions.

Ultra high frequency (UHF) radio-frequency identification (RFID) is among the most ubiquitous technologies in current RTLS use. These most typically operate at around the 900 MHz industrial, scientific and medical (ISM) band (more precisely: 865 to 868 MHz in Europe, 902 to 928 MHz in North America), and tags—which may be passive or active—can be very cheap (on the order of ~£0.10). State-of-the-art systems for real-time tracking of multiple tags typically use a number of transceiving units around a room, for joint identification and tracking of tags. These typically quote, quite optimistically, accuracies of ~1 m, and furthermore as most walls are quite transparent to UHF waves, it is difficult to distinguish between tags that may be in one room or the next. So for these reasons, the technology may not be suitable for applications requiring precise location information. As with the other ISM band methods presented previously, this limitation is due to the narrow bandwidths and fading effects, both of which fundamentally restrict performance and can only be overcome to some extent. Furthermore, the requirement for multiple spatially iverse antennas and transceivers, along with synchronisation and processing units, adds significant cost to the system. There are also more basic gated systems available, in which a tag is scanned only when it passes under, or within the vicinity, of an RFID transceiver, however they cannot track users and assets in real-time. In summary, while UHF RFID is suitable for certain RTLS applications in which multiple tags must be tracked with relatively low accuracy, it is fairly restrictive for high accuracy use-cases, and when installation and infrastructure costs must be kept low.

Ultra-wideband (UWB) technologies have recently been proposed as a solution to the bandwidth limitations of the previously presented technologies. UWB in general covers the bands from 3.1 to 10.6 GHz, although channels typically span only 0.5 GHz, and regional policies may restrict use of some channels or sub-bands. 24 GHz systems, originally developed for automotive radar applications, are also available with bands of around 0.5 GHz. UWB-based RTLS products have been developed with promised accuracies ranging from around 10 to 50 cm for tracking of active tags; however in addition to bulky active tags, careful calibration of multiple costly scanning transceivers is required if precision is to be optimised.

Infrared (IR) scanners have had widespread usage for hospital RTLS applications, as they are a mature technology and are relatively robust. Scanners are placed at strategic points around a room (for example surrounding a hospital bed, or group of beds), and an active tag—either user-worn or attached to an asset—would be detected when in close proximity to the scanner. An advantage of this technology is that detection is localised to individual rooms as the infrared light is fully reflected by walls; this is in contrast to the previously presented RF/microwave techniques, in which the waves may quite easily propagate through the walls, causing false readings. However this has its own disadvantage, in that the method is most implementations of IR RTLS are reliant on line-of-sight between the scanner and the tag, so if a ward gown were to cover the tag for example, it may not be detected.

Ultrasound RTLS technology is predicated on the use of ultrasonic waves, which travel far slower than the speed of light, but which still have short wavelengths. While they are generally quite accurate, they are slow and can have quite poor polling rates, and have not gained much traction for RTLS applications.

Existing product solutions therefore suffer from a combination of: only room-level tracking accuracy, line-of-sight requirements, and high infrastructure costs. Current technology must also often be ceiling mounted and involves closing wards during installation work.

Hence, there is a need for an RTLS system that would minimise infrastructure requirements, while at the same time providing high accuracy at a low cost. Such a system would be able to improve overall hospital efficiency by for example reducing the total assets needed, lower patient waiting times, and reduce staff downtime.

The present invention addresses the above vulnerabilities and also other problems not described above.

SUMMARY OF THE INVENTION

The invention is a mmWave RTLS (Real-Time Location Sensing) system for detecting the presence of one or more objects, the system including multiple anchors, in which each anchor includes a mmWave radar subsystem that uses radar algorithms to detect one or more objects and determine one or more location-based objects characteristics.

Optional features in an implementation of the invention include any one or more of the following:

The location-based object characteristics may include one or more of the following: range, direction-of-arrival, velocity, absolute position, or logical position, each determined relative to one or more anchors.

The location-based object characteristics may be tracked as a function of time and are associated with a timestamp.

The location-based object characteristics may be measured at predetermined time intervals.

Radar algorithms may include MIMO (Multiple-Input Multiple-Ouput) radar algorithms.

Each anchor may include a communication module that communicates with a control centre including a database that receives and stores location-based object characteristics from all anchors.

The communication module may transmit the location-based object characteristics to the control centre, such as every minute or every 5 minutes.

The communication module may communicate with the control centre via Bluetooth or WiFi or other wireless techniques.

The communication module may be a standard or commodity cellular communications module using a standard interface such as 5G device-to-device protocols.

The control centre may include a control processing subsystem that analyses location-based object characteristics from all anchors.

The control centre may wirelessly transmit information from the analysed data to the different anchors.

The control centre may wirelessly transmit information from the analysed data to end-users, such as on an application running on a connected device.

Each anchor may be positioned such that it monitors a specific area or sub-area.

Each anchor may transmit location-based object characteristics via Wi-Fi to an external database.

Each anchor may include: (i) a first antenna array that transmits a plurality of mmWave signals, wherein the mmWave signals are chirped to encompass a plurality of frequencies across a large bandwidth; (ii) a second antenna array for receiving the backscattered mmWave signals;

Each anchor may include a digital front-end subsystem configured to generate the plurality of mmWave signals.

Each anchor may include an RF/analogue subsystem that is configured to process and transmit the plurality of mmWave signals through the first antenna array, receive the backscattered signals through the second antenna array, mix the transmit and receive signals through quadrature mixers, to obtain a complex I and Q signals at an intermediate frequency (IF) band, and filter the mixed signals through a bandpass filter, and output the filtered and mixed signals for baseband processing.

The digital front-end subsystem may be also configured to digitise the outputted signals for further processing;

Each anchor may include a processing subsystem configured to analyse the amplitude and phase of the outputted signals using radar signal processing techniques, in order to detect the presence of one or more objects, and to determine the characteristics of one or more objects in the vicinity of the anchor unit.

The objects may be tagged or untagged.

A tagged object characteristics may include identification (ID) number.

A tagged object may include a passive tag or an active tag.

Tagless objects may be detected by measuring their scattering profiles.

Objects may be moving.

One or more of the objects may be a human.

Each anchor may include an internal memory in which the detected object characteristics are stored.

The system's bandwidth of operation may be: 76-81 GHz frequency range.

The system may achieve cm-level location accuracy.

The system may detect sub-millimetre movements of detected objects by measuring the phase changes of the received backscattered signals.

The system may have plug and play capabilities, wherein each anchor can be plugged into a wall outlet, such as an AC outlet.

One or more of the objects may be a tagged object and in which the tag is a chipless tag.

The chipless tag may have a spectral fingerprint encoded by its geometry.

The chipless tag spectral fingerprint may determined by: determining range of a scatterer from a range FFT (Fast Fourier Transform), then; identifying and constructing a bandpass filter at this range, which is subsequently used to window the captured IQ (in-phase and quadrature-phase) data in the time domain; averaging the data over the total number of chirped frames, to mitigate for noise, with the averaged data giving the spectral fingerprint.

The chipless tag spectral fingerprint may be determined by sweeping a multitude of narrowband chirps, which in conjunction provides the spectral fingerprint across the entire frequency band of operation, as follows: (i) setting a reduced chirp bandwidth which represents a scan for a single frequency bin; (ii) performing a range FFT over this reduced bandwidth; (iii) recording the FFT magnitude for the distance corresponding to the tag, providing the spectral response for this frequency bin; (iv) repeating the procedure for the next frequency bin, in which combining the data for all frequency bins provides the spectral fingerprint of the tag.

The system may be an hybrid system including (i) a primary tracking system including the mmWave radar system, which uses radar algorithms to detect a scatterer and determine location-based objects charateristic of the scatterer and (ii) a secondary tracking system operating at a secondary band with a secondary protocol that is used to detect a tag and to determine a first estimate of the location of the tag;

in which the system includes a processing subsystem that synchronises and processes the data from the primary and secondary tracking system, and determines if the detected tag corresponds to the detected scatterer, providing a second location estimate of the tag which is more accurate than the first estimation when the detected tag correspond to the detected scatterer.

The data from the primary and secondary tracking system are synchronised through comparison of corresponding timestamps.

The secondary protocol may be one of the following: UHF RFID or Bluetooth Low Energy {BLE} beacons or Wi-Fi Positioning System {WiPS}.

The tag may operate in UHF (400 MHz or 900 MHz) or 2.4 GHz or 5 GHz.

The system may not include IR tracking technologies.

The tag may include a transmitter and an antenna capable of transmitting identifying information subject to the relevant protocol used (e.g. Wi-Fi or BLE).

The tag may include a memory chip for storage of encoded identification code.

The tag may include wearable sensors that monitors patient vital signs or environmental conditions.

The tag may include sensors that monitors an object such as an asset activity.

The tag may include a memory chip for storage of encoded identification code and for buffering data for transmission;

Each anchor may be responsible to scan a specific sub-area, in which the sub-areas are defined by 'virtual walls' that have been generated by a software module, and in which each anchor is programmed to (i) monitor objects that are within their specific sub-area or (ii) ignore objects that are within their specific sub-area or (iii) monitor objects that cross their specific sub-area.

The 'virtual walls' may be created manually by a user via a web-browser or an application.

Another aspect is a mmWave tag for measuring the location of a tagged object in which the object is detected using the mmWave RTLS system as defined above.

The tag may not include an integrated circuit, or 'chip' [chipless tag].

The tag may include a metamaterial structure.

The structure may be a split ring resonator.

The size of the tag may be less than 5 mm.

The metamaterial structure may be composed of a conductor (e.g. copper) on a flexible dielectric.

The tag 'spectral fingerprint' may be used to identify the tagged object.

The tag may be worn on a wristband or a patch.

The tag may be tattooed on a human.

The tag may be sewed on fabric.

The tag may be transparent.

Another aspect is a method of tracking an object using the mmWave RTLS system as defined above.

The method may be implemented in a hospital environment and the object is a patient or a staff or an asset within the hospital environment.

BRIEF DESCRIPTION OF THE FIGURES

Aspects of the invention will now be described, by way of example(s), with reference to the following Figures, which each show features of the invention.

DETAILED DESCRIPTION

The millimetre wave (mmWave) regime (approximately 30-300 GHz) encompasses the band of the electromagnetic spectrum between microwaves (Wi-Fi, mobile phones) and infrared. Millimetre wave technologies have not as yet been used for RTLS applications, primarily as the microwave monolithic integrated circuit (MMIC) technology has only very recently matured with improvements in complementary metal oxide semiconductor (CMOS) and Silicon Germanium (SiGe) processes that are now fast enough to handle frequencies of up to 80 GHz and above, and bandwidths above 4 GHz. Prior to 2016, mmWave systems used bulky and expensive discrete components, but recently a number of the major semiconductor manufacturers (Texas Instruments, Infineon, NXP) have released lines of mmWave integrated circuit chips, primarily targeted at the automotive and industrial radar sectors. MmWave electronics also have application to other wireless technologies at other bands (e.g. 60 GHz for IEEE 802.11ah WiGig and from 24 GHz for 5G telecommunications).

Millimetre waves also have great potential for indoor tracking. In conjunction with the recent development of technologies such as MIMO radar, which leverage the great improvement in processing power described by Moore's law, there is potential to achieve extremely high tracking resolutions.

A mmWave RTLS system that robustly tracks objects, without line-of-sight restrictions but with superior room-level isolation is presented. This system could be particularly suitable for hospital operations applications, for which the tracking of assets (patients, staff, and equipment) has many potential benefits to health outcomes, hospital efficiency and patient flow, and financially. The system presented includes a 77 GHz millimetre wave multi-input multi-output (MIMO) radar that accurately senses the location and velocity of one or more tags, and other objects with sufficiently large radar scattering cross-sections (RCS).

1. The RTLS System

Figure 1:
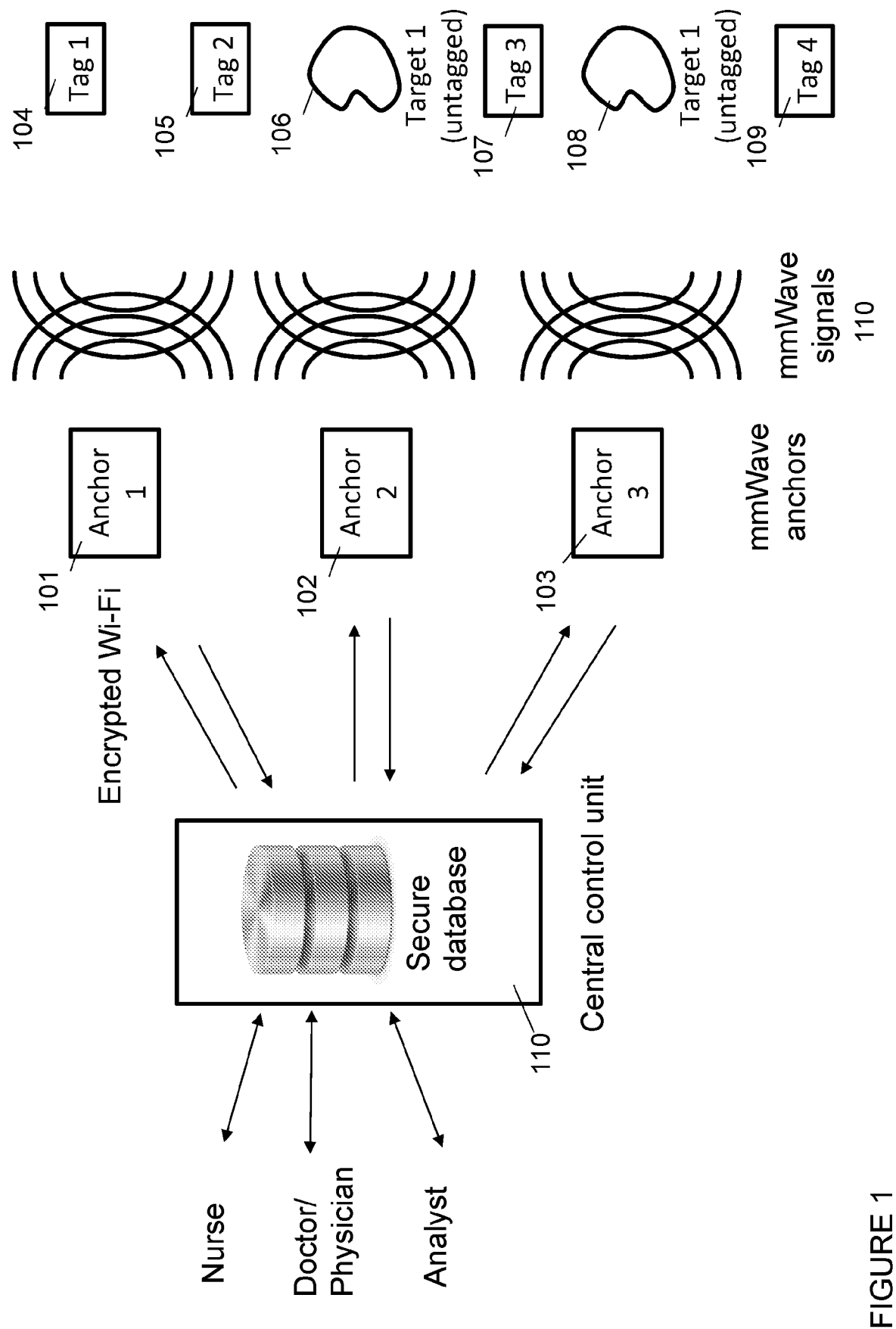
FIG. 1 shows the main components of an RTLS system including a network with database and processing control centre, multiple anchors, multiple tags, and a variety of end-users (nurses, doctors/physicians, analysts).

With reference to FIG. 1, an RTLS system is shown as applied to, for example hospital tracking. Multiple anchors (101, 102, 103) are used to detect the positions and movements of objects (104-109), which may be either tagged (104, 105, 107, 109) or untagged (106, 108) targets. The objects may be detected and tracked across different areas such as rooms, hospital wards or hallways. Each anchor may easily be plugged into an AC outlet and is positioned such that it monitors a specific area. Each anchor is configured to transmit RF signals, and to receive and analyse backscattered signals (110) in order to detect the presence and location of the one or more tags.

Detected tag characteristics are then transmitted wirelessly (e.g. via encrypted Wi-Fi) from the anchors to a central control unit (110), which includes a main processing system and a secure database. At the central control unit, a decision is then made to communicate the tag characteristics (either in whole or partially) to end-users such as nurses, doctors/physicians, and analysts. End-users may then use of the data to, as necessary, control patient flow, identify equipment locations and availability, and advise on operations. As an example, a nurse may be able to automatically visualise bed space availabilities/occupancy and their locations on an application running on a connected device. Use cases examples are described in Section 4.

Figure 2:
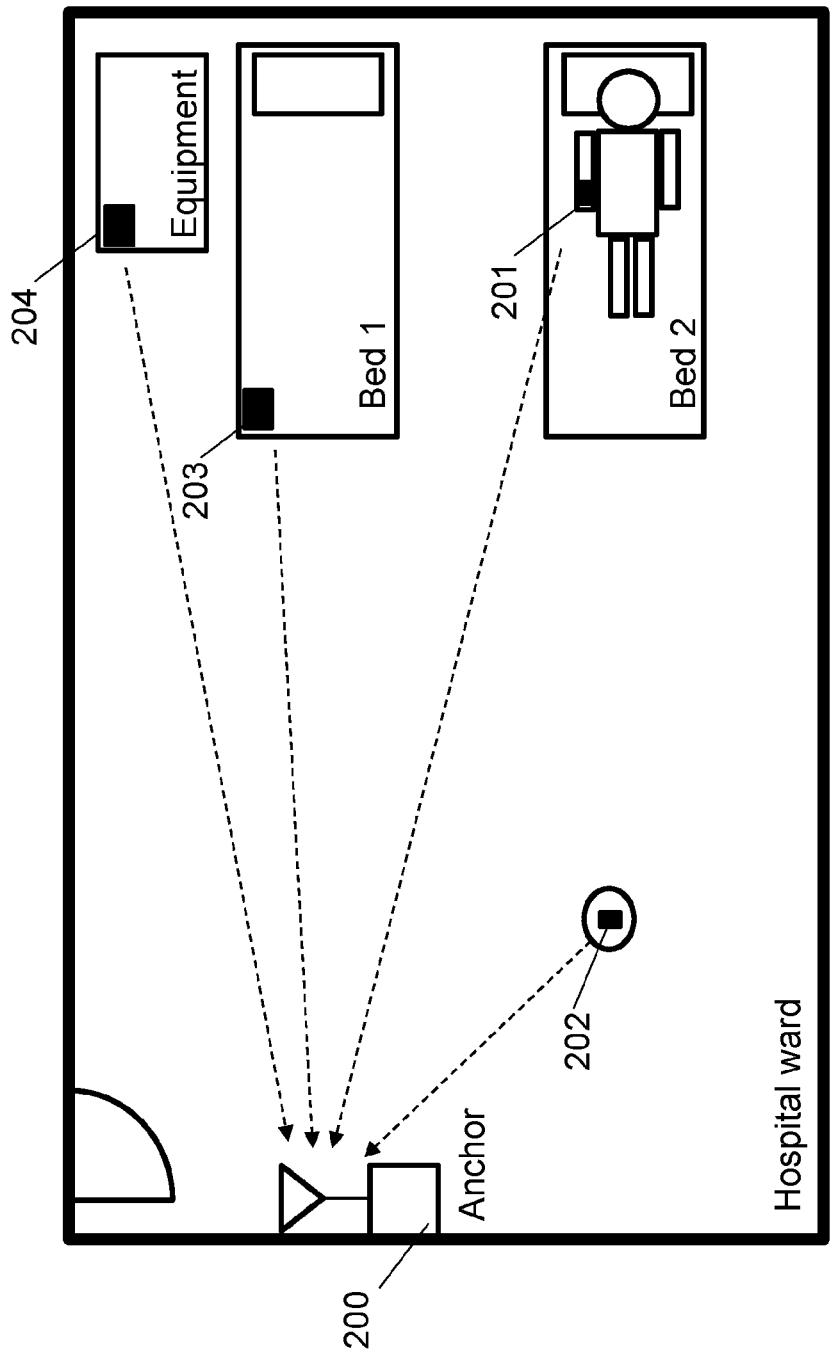
FIG. 2 shows a mockup of a ward (room) with an anchor and multiple tags.

With reference to FIG. 2, a hospital ward scenario is shown in which a single anchor unit is located on or near a wall, for detection and tracking of a number of tags. The tags may be body-worn (by patients (201) or staff (202)), or mounted on equipment or assets, such as a ward bed (203) or infusion pump (204). Details of the anchors and tags are presented in the following sections.

1.1 the MIMO Radar

The system is capable of tracking objects to extremely high precision (centimetre-accuracy location, and mm-accuracy movements) through use of MIMO radar. MIMO radar leverages recent improvements in processing technology to improve angular resolution capabilities of radar systems. A MIMO radar is used to detect scatterers, which is defined as an object with sufficiently large radar cross section (RCS) such that it can be detected over the background noise. These scatterers may take the form of:

untagged targets (e.g. equipment, patients or staff),
tags,
or other features present in the scanned area (including clutter).

Figure 3:
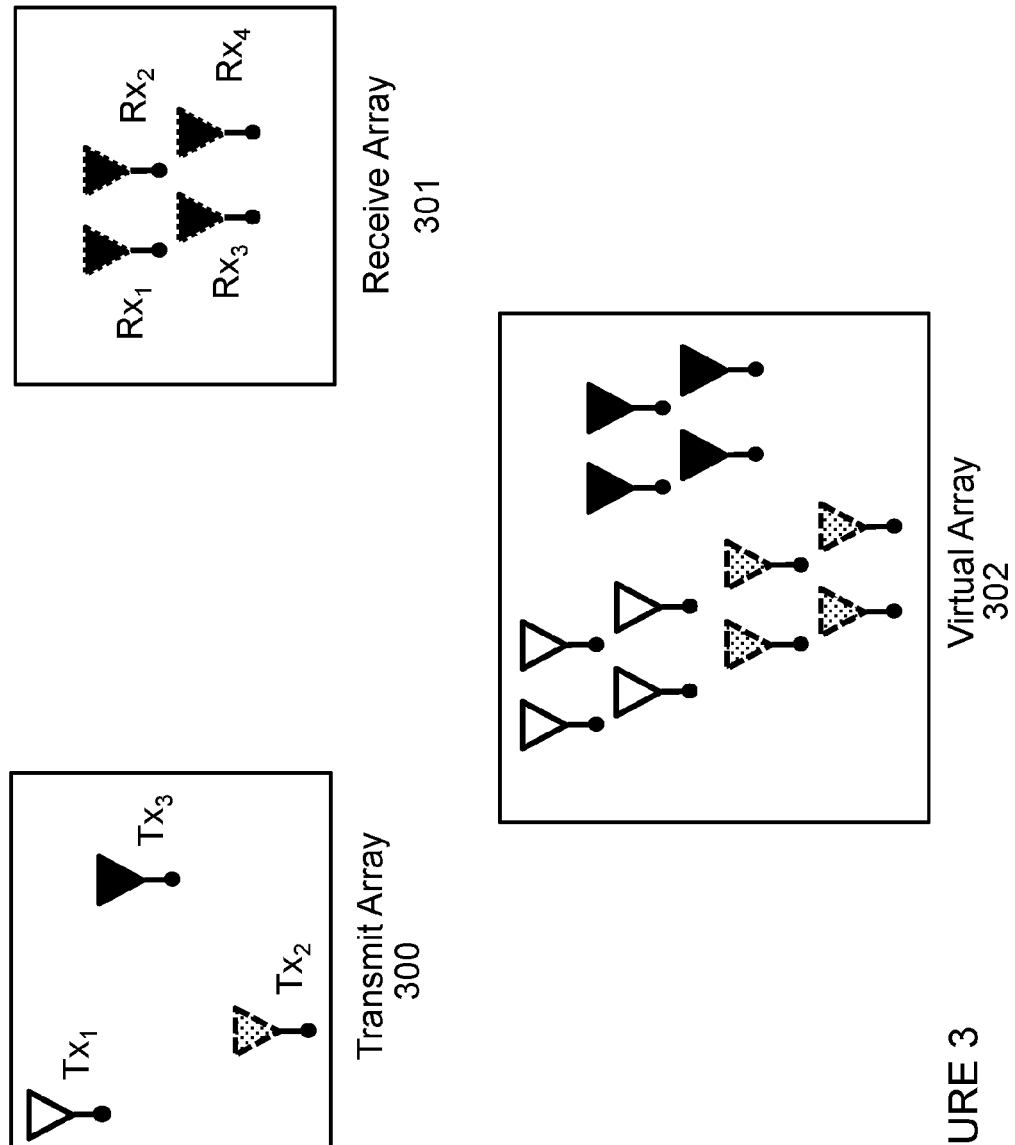
FIG. 3 shows a diagram illustrating an arbitrary MIMO radar in which a 12 element virtual array is formed through convolution of a 3 element Tx and a 4 element Rx array.

With reference to FIG. 3, the concept behind MIMO radar is shown, in which an M element transmit array (301) and an N element receive array (301) are combined to produce an M×N virtual array (302). By simultaneously transmitting M orthogonal signals, each from a different antenna, and receiving from N antennas, an enlarged effective radar aperture is created corresponding to the convolution of the Tx and Rx arrays. This results in a radar aperture which effectively has the resolving performance (and thus tracking accuracy) of an M×N array.

In the scenario shown, the transmit array has 3 elements, the receive array has 4 elements, and the virtual array has 12 elements, formed of three subarrays of four elements each. Each subarray will be identical to that of the receive array, while the subarrays as a whole are each shifted in accordance with the coordinates of the transmit array elements. To achieve waveform orthogonality, one of a number of modulation schemes may be used, such as time-division multiplexing (TDM) or binary phase modulation (BPM). This technology is enabled by digital signal processing capabilities, which allow generation of appropriate transmit signals, and subsequent analysis of signals from each and every one of the receive antennas. Furthermore, digital beamforming techniques may be applied to resolve extremely fine spatial details, and to control transmit beam profiles.

Figure 4:
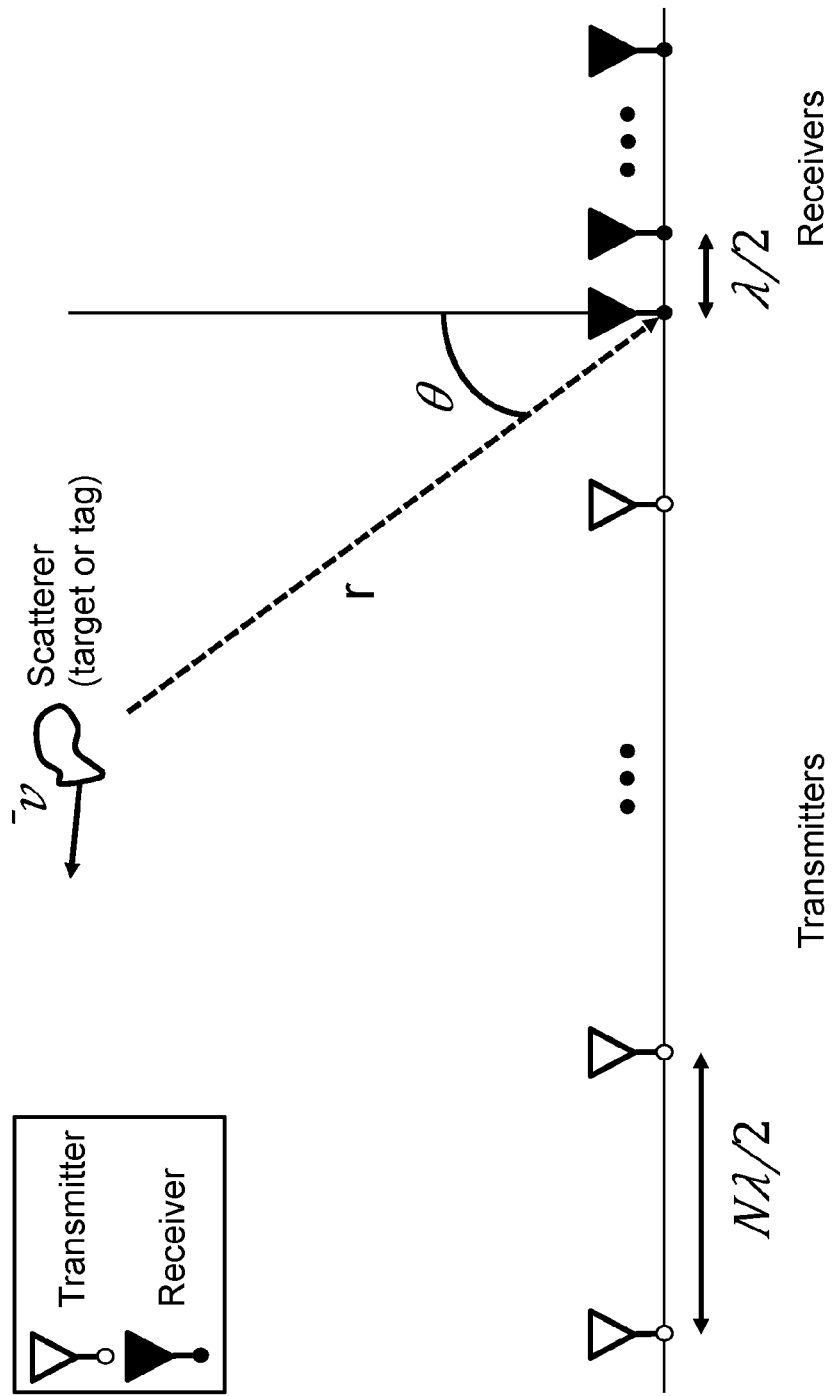
FIG. 4 shows a typical MIMO radar system consisting of linear arrays of M transmitting and N receiving antennas.

With reference to FIG. 4, a typical MIMO radar system consisting of M Tx and N Rx antennas is shown. The system may be implemented as, for example, a frequency modulated continuous wave (FMCW) radar, in which the transmitting frequency is chirped across the relevant bandwidth (77 GHz to 81 GHz in this case), with the received signals mixed and transmitted through ADCs for post-processing. The details of the system implementation is described below, but in general the MIMO radar system provides information on time delays (phase shifts) and frequency shifts of the signals, which are processed through standard radar signal processing techniques to determine target range, direction-of-arrival, and velocity.

For the limiting case of a single Tx and a single Rx antennas (M=N=1), effectively a bistatic radar, the time delay of the signal can be used to determine the distance to the target, while the frequency (Doppler) shift gives velocity information. However in this case, angular information cannot be determined so one may state that an object is, for example, 5 m away, but such a system cannot distinguish or determine whether the object is directly ahead, or at a 30° angle.

In order to evaluate the precise direction-of-arrival of the received signal, multiple antennas are required. With reference to FIG. 4, a signal has been scattered off of a target (or scatterer). The signal is incident on the multitude of receive antennas at an angle θ (assuming far-field operation, the incident wave is assumed to be a plane wave, and the incident angle is approximately equal on both antennas). A phase delay between the multitude of antennas is due to their respective time lags for the incident electromagnetic wave, which follows the familiar form $e^{-j(k \cdot r - \omega t + \phi_0)}$, where k is the incident wave vector and r is the location vector between the target and the antenna. The phase shift between the antennas is then given by the projection of the wave vector onto the array axis, such that $\phi = kd \sin \theta$. For a coherent radar system, in which both the in-phase (I) and quadrature-phase (Q) components are acquired, the phase is given as the angle between the I and Q components, and so the incident angle-of-arrival can be determined as:

$$\theta = a\sin\frac{\phi}{kd} = a\sin\frac{\phi\lambda}{2\pi d}.$$

Where the wavelength λ is given by the frequency of operation, while d is the separation between the antennas. ϕ spans the range $\{-\pi, \pi\}$, and so a separation of $d=\lambda/2$ between receive antennas, as in FIG. 4, will allow resolution of the largest range of angles, $\theta = a \sin \phi/\pi = \{-90°, 90°\}$ (note: while $d=\lambda/2$ only holds for one frequency within the band, it will be approximately correct over the entire band with a worst-case error of around 5% for the 77-81 GHz band, with minimal impact only on the range of scanning angles). To extend this separation to the virtual antennas, the transmit antennas must have separation $d=N\lambda/2$. In general, there will be a linear phase shift between each sequential antenna, i.e. they will have phases $\{0, \phi, 2\phi, 3\phi, \ldots, (N-1)\phi\}$. Using this information, the angles-of-arrival of tracked signals may be determined using one of a variety of algorithms, including beamforming, MUSIC, root-MUSIC, or ESPRIT.

For the collinear arrays in FIG. 4, the range r, azimuthal angle of incidence θ, and velocity v, can be determined. It is noted that a plane wave incidence has been assumed, whereas in practice if the target is electrically close to the radar this may not be the case, and so there will be errors in the extracted direction-of-arrival. However, the errors would not be substantial, particularly so for the applications provided here (they are primarily noticeable for ranges of under around 1 m). Nevertheless, on determining the range and direction-of-arrival, these errors may be compensated for in post-processing by accounting for the sphericity of the waves. The collinear array discussed here is capable of detecting only in two dimensions (on the x-y plane), with the elevation angle left unresolved, but for many hospital applications, such as patient fall-detection, it is necessary to detect tag location in three dimensions.

Figure 5:
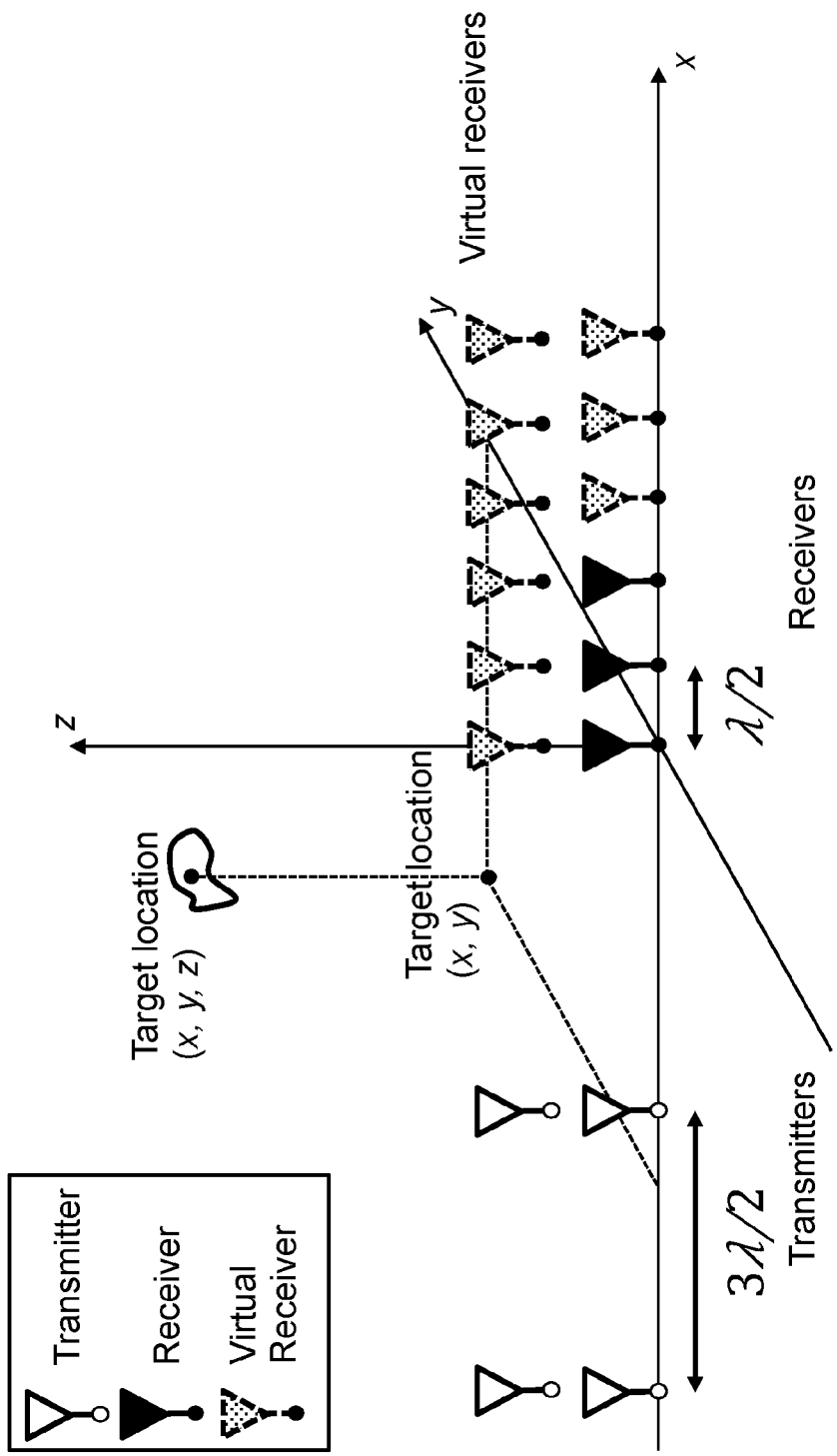
FIG. 5 shows a 2D MIMO array, with a 2×2 transmit array (in the x-z plane) and a 3×1 receive array, creating a 6×2 virtual array.

With reference to FIG. 5, a coplanar 4×3 MIMO radar is shown, forming a 12 element virtual array. The offset of two of the transmit elements along the z-axis effectively makes the virtual array two dimensional (in the x-z plane), and so the target elevation angle can be tracked, in addition to azimuth angle, range, and velocity. The methods for determination of angles are much the same as the previous scenario, and algorithms such as beamforming, ESPRIT, MUSIC, or root-MUSIC can again be used with minor modification. Subsequently, the three dimensional coordinates (x, y, z) of the target can be determined.

1.2 MIMO Radar System Overview

We now provide an example with an RTLS system including a MIMO radar system operating within the mmWave regime.

Figure 6:
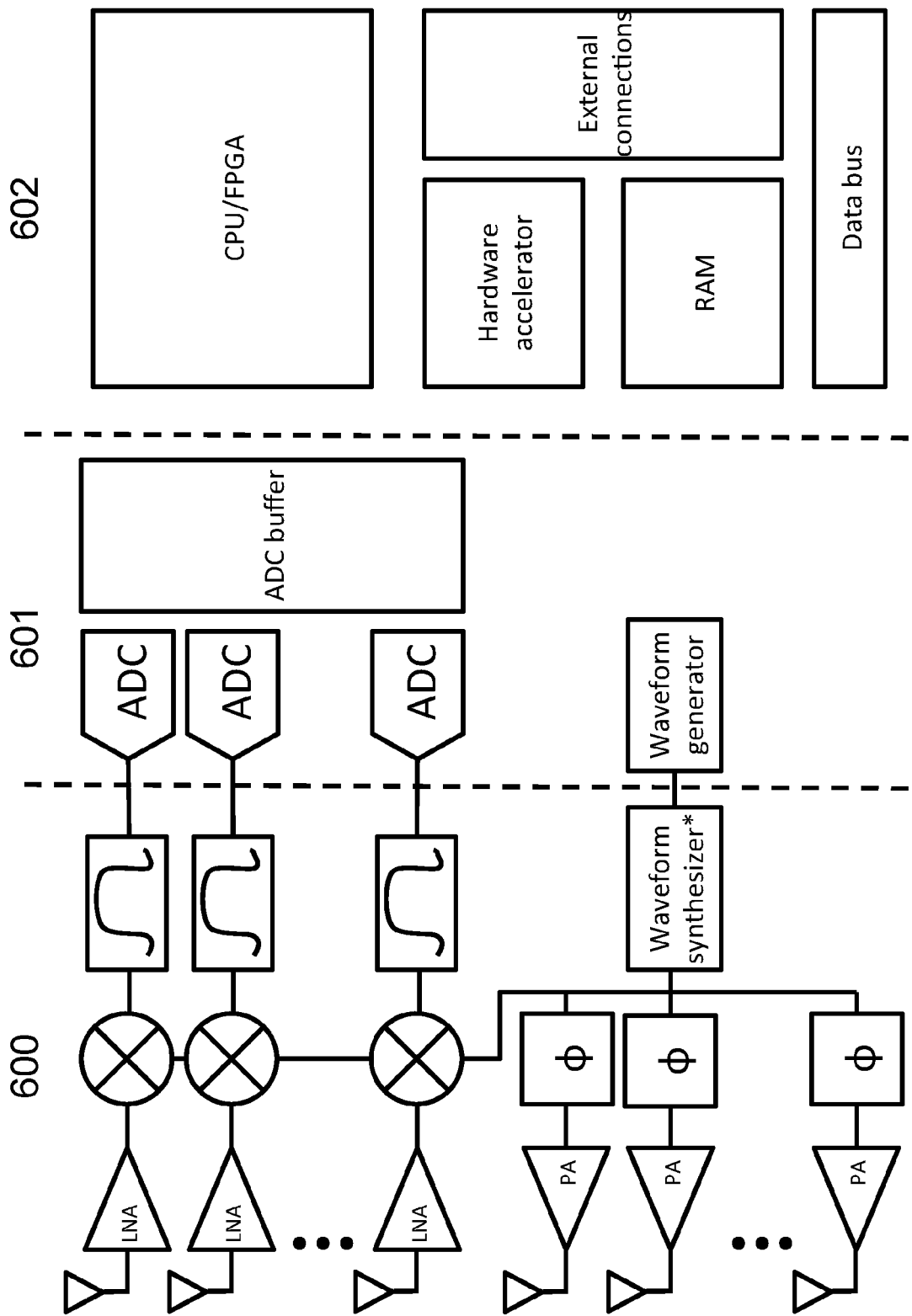
FIG. 6 shows a radar composed of three subsystems: RF/analogue subsystem, digital subsystem, and processing subsystem.

With reference to FIG. 6, a block diagram of the mmWave radar, which is included in the radar, is shown. This consists of the following subsystems:

a digital front-end subsystem (601) configured to:
  (i) generate the plurality of mmWave signals which will be transmitted by the radar, and;
  (ii) digitise the received signals, which are outputted from the RF/analogue subsystem, in preparation for further processing.

an RF/analogue subsystem (600), which is configured to:
  (i) synthesise the generated plurality of mmWave signals and up-convert to the relevant RF band for transmission;
  (ii) amplify the signal through a power amplifier (PA) and possibly phase shift through a phase shifter (ϕ);
  (iii) transmit the signals through each of a multitude of antennas, separated by a predefined distance, which compose a transmit array. The transmitted signals are modulated using an appropriate scheme (e.g. TDM or BPM);
  (iv) receive the scattered signal through each of a multitude of antennas, separated by a predefined distance, composing a receive array. Amplify the signals through a low noise amplifier (LNA);
  (v) mix the transmit and receive signals through quadrature mixers, to obtain the complex I and Q signals at the intermediate frequency (IF) band, and filter through an appropriate bandpass filter to prepare the signals for conversion through ADCs. The signals are then outputted for baseband processing.

a processing subsystem (602) configured to analyse the amplitude and phase of the digitised signals using radar signal processing techniques, to detect one or more objects, and to determine the characteristics (position, velocity, and other relevant information extracted from the radar signals, as necessary) of one or more objects in the vicinity of the anchor unit. The processing subsystem sends the tag characteristics with a matching timestamp to a central database (on a central server or cloud) for storage using a communication chip (such as Wi-Fi or Bluetooth).

A 77 GHz MIMO radar system has been developed around the Texas Instruments IWR1443 single-chip mmWave sensor. The chip has sensing capabilities over the band from 76 to 81 GHz, with a 4 GHz continuous bandwidth restricting application to the 77 to 81 GHz range. MIMO radar algorithms, as described in the previous section, are incorporated into the chip's on-board memory and processor.

Figure 7:
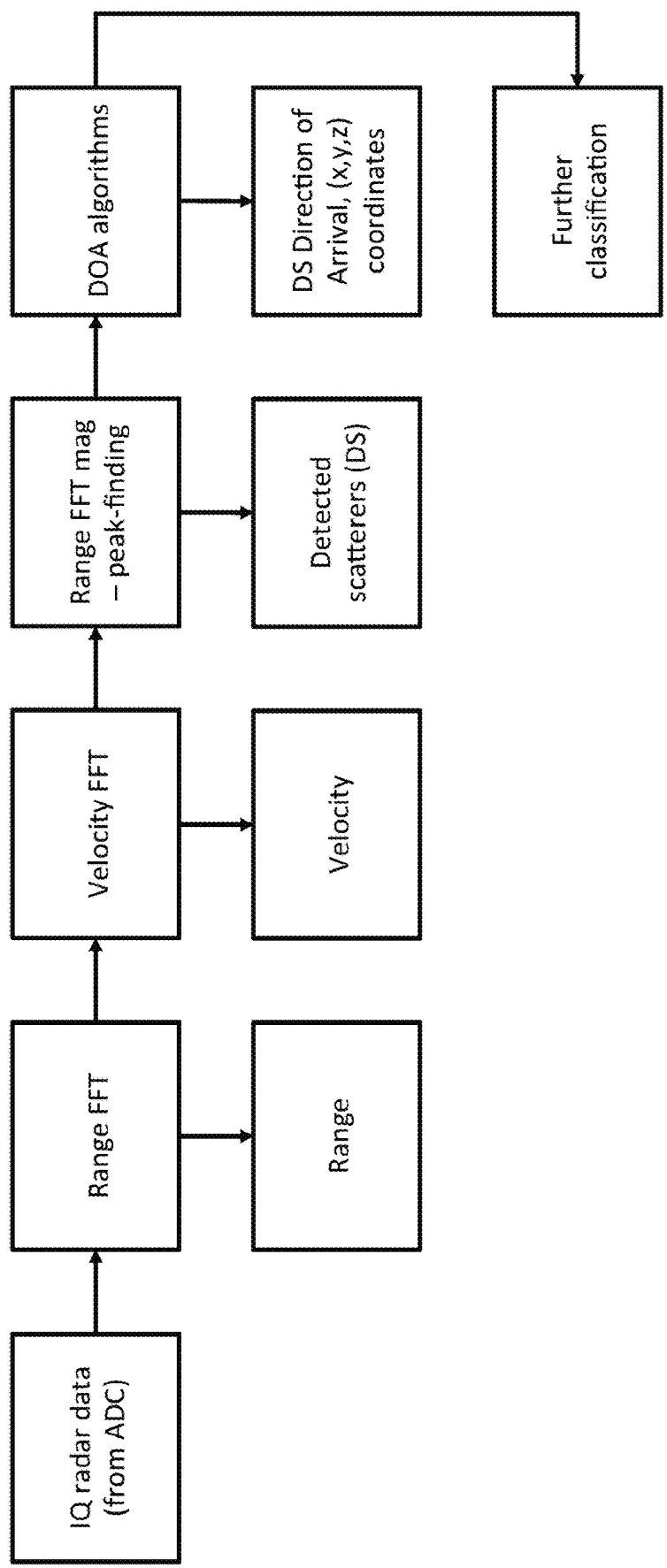
FIG. 7 shows the general procedure for determining range, velocity, and directions-of-arrival of detected scatterers.

With reference to FIG. 7, the overall flow could be as follows: on receiving the scattered signals, mixing them down to the IF band and filtering, then processing through the ADC as I and Q signals, representing the complex IQ data. A first FFT is then performed to determine range (range FFT), followed by a second FFT to obtain velocity (velocity FFT). The combination of this information forms a standard radar cube (which includes range and velocity profiles). A peak-finding algorithm is then applied to the range FFT magnitude data to search for detected scatterers (which will appear as peaks above the background noise). Finally, relevant algorithms (such as MUSIC) to determine the directions-of-arrival of detected scatterers.

Additionally, further algorithms may be applied to aid tracking, including:
- tag identification wherein the returned signal is processed for the presence of a mmWave tag;
- implementation of user-defined virtual walls;
- correlation with data from tags tracked using hybrid techniques.

These are further described in the following sections.

1.3 Creation of Virtual Walls

Virtual walls may be created by users to define specific enclosures or zones that need to be monitored by the system. Virtual walls may be used for example for partitioning rooms, wards, hallways, or any other relevant patient or asset flow areas.

Current RTLS systems often use infrared sensors near the virtual wall location. In comparison, the presented system does not require IR sensors, and is defined wholly through software to encompass an arbitrary area. Through knowledge of the coordinates (with respect to the anchor) of desired partitions, these can be inputted into the post-processing stages of the software to define the virtual walls.

Figure 8:
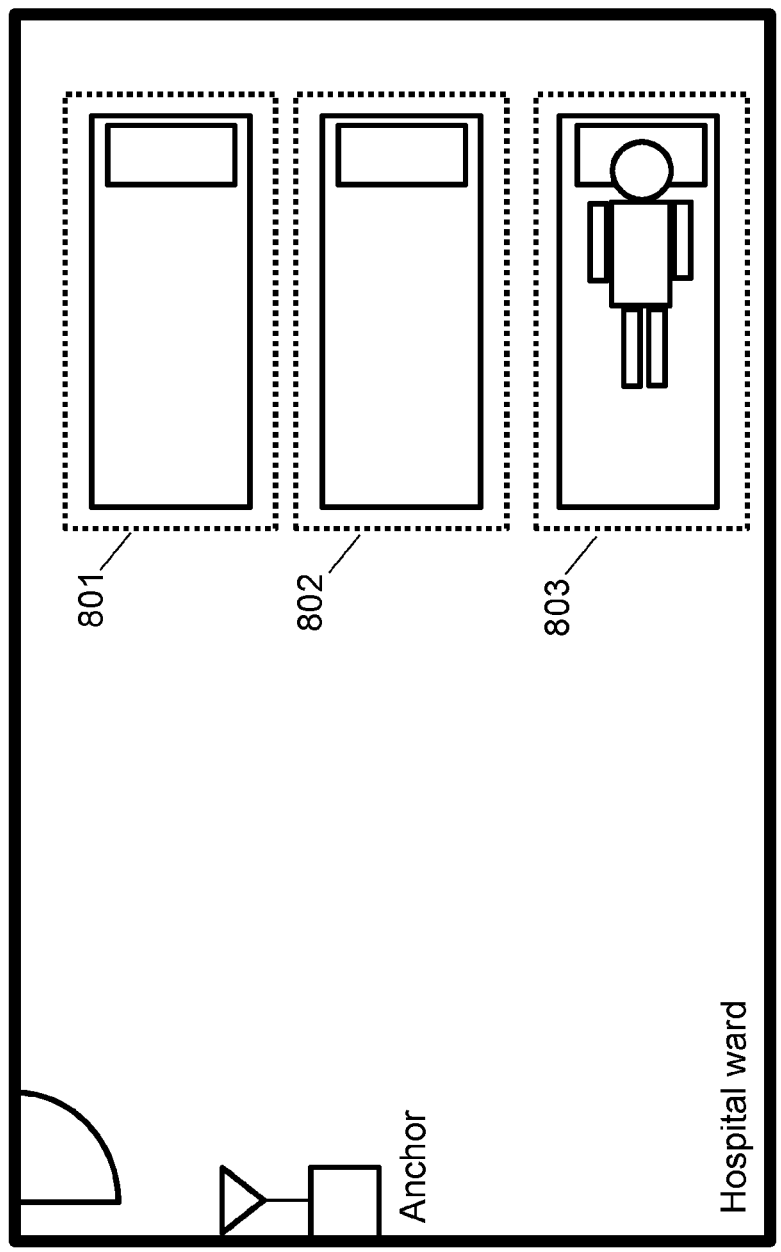
FIG. 8 shows a diagram in which virtual walls are used to define partitions for monitoring user-specified areas.

With reference to FIG. 8, the concept of a 'virtual wall' is demonstrated through a specific application. A virtual wall is a partition, located within a radar's scanned area. Through knowledge of the locations of the beds (or other areas of interest), virtual walls are specified in software to encompass the beds and the area surrounding them; in this scenario three virtual walls (801, 802, 803)—one for each of the beds—are defined. The virtual wall boundaries may be created either automatically by the system, or manually by a user, via a user interface on a web browser or on an application running on a connected device, and by inputting relevant coordinates (such as the start and end points of a wall). The virtual walls are used to define an area such that: (i) targets are only monitored within the virtual wall areas, or; (ii) targets within the virtual wall areas are ignored, or; (iii) virtual wall partitions are monitored for targets crossing them.

In this example, bed occupancy inside a ward is monitored. This may be particularly useful for monitoring bed availability/occupancy of in-patient wards, or for monitoring outpatient clinic areas for which it may be impractical to tag patients. By creating virtual walls, the system monitors a space (e.g. bed space) within a virtual wall to detect the presence (or absence) of objects or targets (i.e. scatterers) over a period of time. Hence, the following scenario may happen, all the following steps may be visualised by an authorised end-user on a user interface running on a web browser or an application or linked directly to hospital information systems (e.g. Patient Administration Systems, Hospital Management Information Systems):
- Bed is empty for a duration that is higher than a predefined threshold indicating the bed availability;
- Presence of a human is detected within the virtual wall, so a timestamp of the detection is recorded. Bed occupancy is now flagged as [occupied]. The patient may then leave and come back, for example to have further tests within the hospital or to go to the bathroom. Bed occupancy flag stays [occupied].
- Bed is then empty again for a duration that is higher than a predefined threshold, and the patient is marked in a workflow system as "ready to leave the hospital" and flag now changes to [unoccupied]; optionally, the system may then send an alert for a cleaner to clean the bed, and flag is set to [awaiting cleaning].
- Patients may also be discharged in a workflow system by arrival at a designated location (e.g. waiting area for transport, discharge lounge).
- If tags are tracked, the presence of a tagged cleaner within the virtual wall is be detected, and on leaving the flag is changed to [unoccupied] to indicate availability of the bed for another patient.
- Furthermore, if tags are tracked, the presence of tagged staff at a location that is within or near the monitored virtual wall is also simultaneously recorded. A history of staff visits is recorded, which may be viewed in real-time by authorised staff, or at a later time to monitor care of patients.

As an additional example of application, virtual walls may be used in order to monitor the frequency of use of a hand sanitising station, wherein virtual walls are defined to surround the hand sanitising station, and through which the numbers of targets entering the defined area and remaining within it for a period of time, provides a count of the frequency of use. A further application could include a count of frequency of use of side rooms, wherein an anchor-monitored hallway with one or more side rooms will have virtual walls defined for each of the room entrances to be monitored, and a count of targets crossing the boundary to the side rooms is recorded over a period of time.

1.4 Hybrid Tracking Approach

Hybrid tracking techniques are defined here as location sensing techniques which combine mmWave radar (the primary approach as described above) with other (secondary) approaches, including (but not limited to) UHF RFID, WiPS, or BLE beacons.

This approach may be attractive if the high precision of mmWave radar is necessary, and in addition: (i) larger numbers of tags are required as compared to what the passive tag approach can provide, or; (ii) active tags are required to transmit additional information, particularly if the tag is linked to sensors. Examples could include the monitoring of patient vital signs, or transmission of equipment sensor data (such as local temperature and relative humidity levels).

While active tags necessitate the incorporation of batteries into their design, high polling rates are not required so battery life is substantial (measured in months). Furthermore, operational distances are relatively short (~10 m), so high signal-to-noise ratios are not necessary, further extending battery life and reducing antenna requirements; multiple off-the-shelf single chip solutions exist (e.g. for UHF or BLE) so tag costs, while higher, will not be significantly increased.

The secondary approach provides a first-order estimation of tag location, typically only accurate to within at most around 1 m, wherein we define the specific value used as the position distribution radius, which can be defined using the standard deviation of errors of actual position compared to measured position, and which is dependent on the method used, specific implementation of algorithms, and environmental considerations. As a measurement is made, a timestamp is allocated to the location and received data as they are received at the anchor's processing unit. This estimation is then synchronised with the processed mmWave radar data with the closest matching timestamp, to identify the a more accurate (centimetre-accuracy) location of tracked tags at that point in time, which we call the 'actual tag location'.

Figure 9:
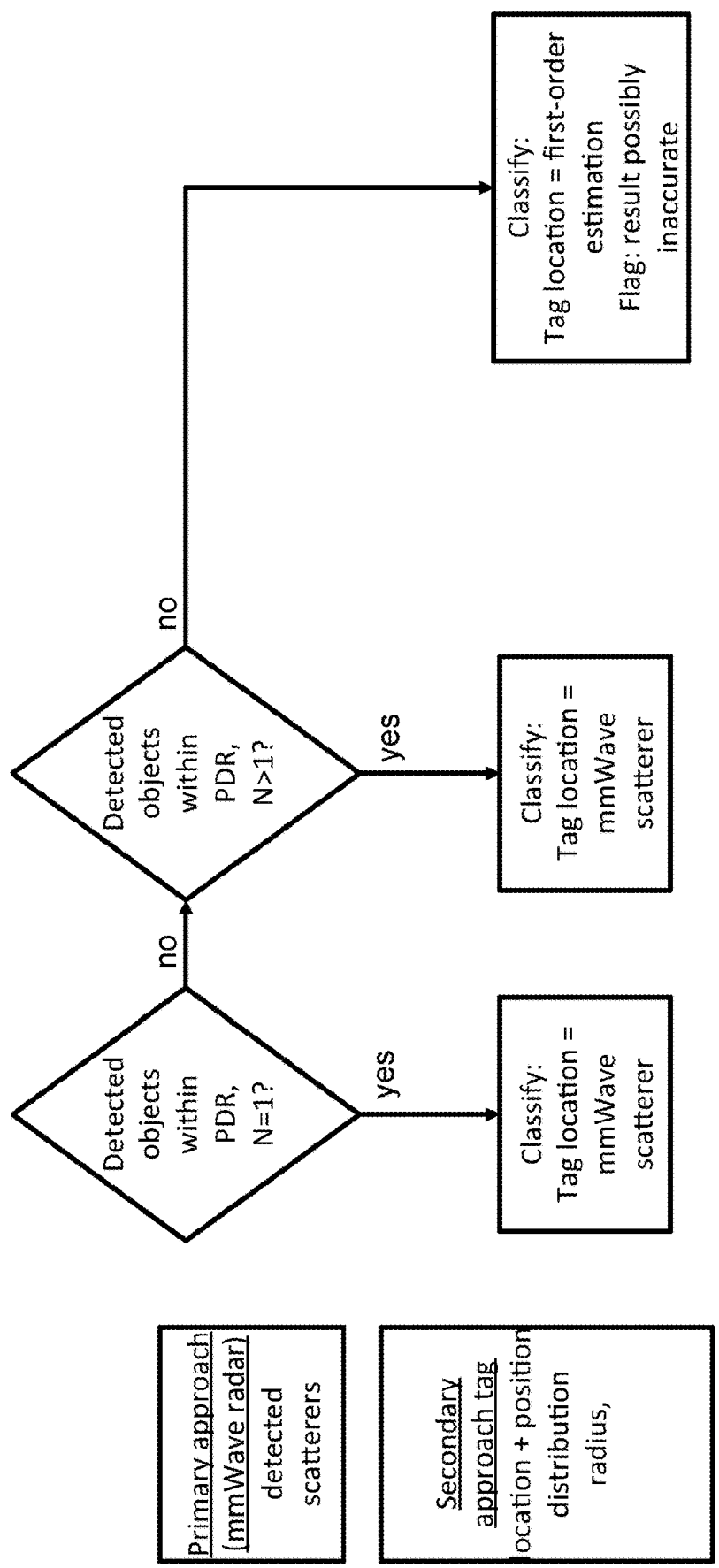
FIG. 9 shows the general procedure for a hybrid system, for classifying detected scatterer locations from mmWave radar, and tag information from a secondary system, and combining data from the two approaches.

With reference to FIG. 9, the primary (mmWave radar) and secondary scans (secondary approach) are performed independently, then the first-order estimation of tag location is determined from the secondary approach, then for each detected tag:

(i) if one scatterer is detected by the mmWave radar within the position distribution radius of a tag detected by the secondary approach, then that scatterer's location is classified as the 'actual tag location', or;

(ii) if multiple scatterers are detected by the mmWave radar within the position distribution radius of a tag, then a decision is made on which scatterer is likeliest to match the tag. For this, their range FFT gains are compared and correlated with earlier frame detections from both approaches. The time evolution of the scatterer's motion matches that of the tag's, allowing determination of the scatterer which has greatest likelihood of being the tag, and setting that scatterer's location as the 'actual tag location' or;

(iii) if no scatterers are detected then the 'actual tag location' is classified as the location detected by the secondary approach, and this location is flagged such that an end-user is aware that the detected location may suffer from inaccuracy.

Figure 10:
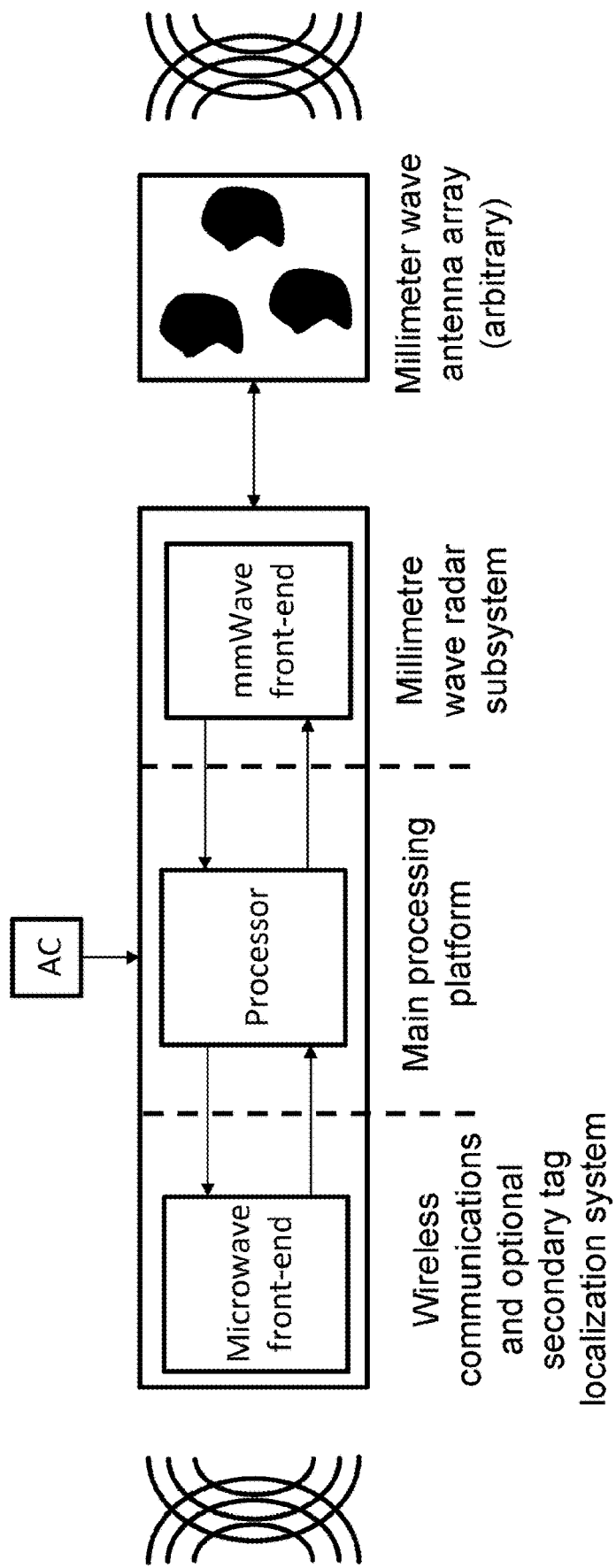
FIG. 10 shows an anchor composed of an antenna array, radar subsystem, microcontroller platform, microwave front-end (wireless communications and optional secondary tag location system), and AC powered unit.

With reference to FIG. 10 the main components of an anchor unit within the RTLS system are shown, which includes: (i) the transmitting and receiving mmWave antenna array, the configuration of which may be varied to suit the specific application and implementation; (ii) the radar subsystem, which was described in FIG. 6; (iii) a microwave subsystem, which includes a wireless communication link with the central control centre (e.g. a Wi-Fi module with appropriate antennas), and optionally the secondary localisation system (such as UHF RFID, or BLE beacons, or WFPS) to obtain a first approximation of tag location, and to communicate relevant information (including tag ID); (iv) a microcontroller unit which will serve as an interface between the different subsystems, to communicate radar target information to the microwave subsystem, and to communicate update configurations to the radar subsystem; (v) an AC power unit such that the unit can be plugged into a standard AC wall outlet.

2. Tag Design 2.1. Principles of Operation

A variety of tagging systems may be used in operation for RTLS applications, with the vast majority using active technology. Active tags transmit a signal to the sensing unit, which works as a detector to spatially localise the transmitted signal. While active tags provide good location sensing capabilities—as they benefit from high signal-to-noise ratios—they suffer from the requirement to power the tag transmitter, adding excessive bulk and additional cost in the form of batteries and associated electronics. For hospital-based applications, this results in discomfort for users (both patients and staff), and is impractical in many cases for asset tagging, particularly for smaller items. Furthermore, it necessitates a requirement to recharge or replace tag batteries, which further inconveniences users, and tags which are not returned or are disposed of must be replaced at possibly high expense. Beyond the hospital RTLS market, many other sectors exist which benefit from indoor location sensing, such as warehouse and retail tracking, and logistics. For these scenarios in particular, the necessity to keep tagged costs to a minimum is absolutely vital for their viability.

We discuss three implemented tagging solutions: (i) passive mmWave tags; (ii) hybrid approaches with active tags; (iii) tagless tracking.

2.2. Passive Tags

The development of a passive tag would clearly be of great benefit, but while passive RFID tags currently exist, they generally only operate to at most the 960 MHz UHF band, and do not allow spatial localisation.

Passive UHF RFID tags currently work by harvesting the energy of a transmitted signal, encoding that signal with information from memory, and then retransmitting it back to the transceiver. A great benefit is that no internally-stored energy is required, and so tags can be significantly cheaper (and more compact). Current passive tag systems typically have an antenna for receive/transmit, and a semiconductor chip which can store data and encode it onto the signal. Chip technology limits the frequency of operation, as currently available passive processes do not allow for modulation of mmWave signals (i.e. in the 77 GHz band). Therefore, only with the development of robust chipless technologies, are mmWave passive tags currently feasible.

Figure 11:
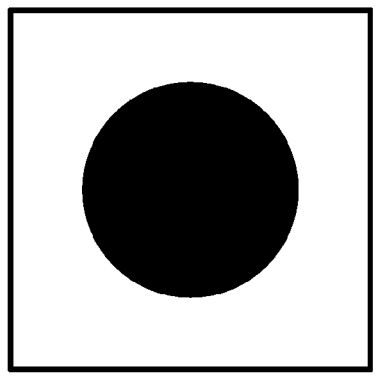
FIG. 11 shows the concept of mixing different meta-atoms to create a metamaterial structure, which can be designed to exhibit a specific desired response.
Figure 11:
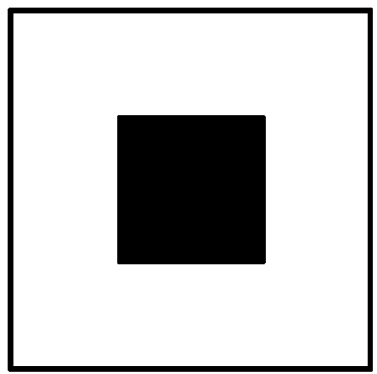
Figure 11:
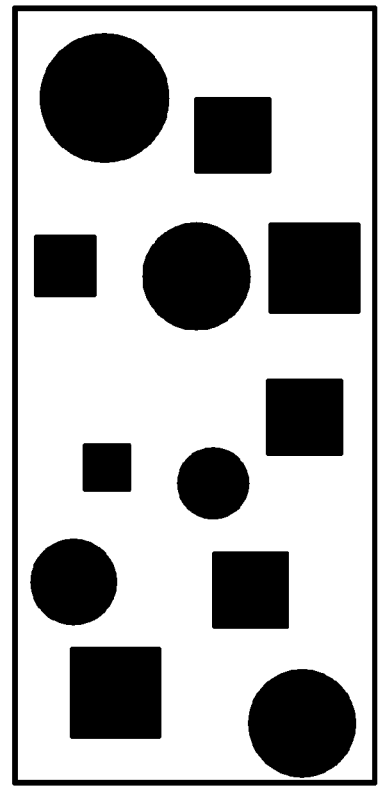

For unique identification of tracked subjects, a chipless tagging technology is developed. Key to this technology is the ability to design and engineer the electromagnetic response to a wave over the desired mmWave band, and for this purpose metamaterial technology is applied. With respect to FIG. 11, a metamaterial is a material in which its overall response may be designed to differ from that of its constituent materials; this ability is key because a tag may be fabricated out of copper and plastic, which have no special properties within the mmWave band beyond being conductors and insulators, respectively, however we wish them to have more interesting characteristics that we can detect and classify. Similarly, we may define a meta-atom as a unit-cell which consists of a geometric structure of fixed shape (but in which size may be varied), in which the unit-cell has dimension smaller than a wavelength, and which may be repeated to create the metamaterial. So a metamaterial may be composed of a conglomeration of one or more types of meta-atom (meta-atom 1 and meta-atom 2 in FIG. 11), but the meta-atom types can individually vary in size. Based on this fact, the metamaterial tag we have designed is composed of a combination of subwavelength meta-atoms fabricated with copper on a flexible plastic, where each meta-atom is similar in form but with slightly perturbed dimensions so together they serve to either absorb or scatter different frequencies within the 77 to 81 GHz band.

To characterise the properties of the tag, we define a spectral fingerprint, defined as the unique scattering profile of a tag across a frequency band of interest, wherein scattering at a multitude of frequencies is detected by a radar, and the detected relative scattering amplitude may be high or low in any particular frequency bin compared to a baseline value (e.g. the mean detected value across the range), and these high or low values are interpreted as logic-1 or logic-0 respectively. The combination of logic-1 and logic-0 detections across the band allows unique identification of up to $2^K$ different tags, where K is the number of frequency bins across the band. By detecting these frequencies, the unique spectral fingerprint of a tag may be scanned to identify and classify a scatterer in the presence of other objects and clutter. Additionally, physical processes may limit the density of resonances within a specific band, and which will further restrict the maximum value of K. To have a high density of resonances, a high quality (Q) factor is necessary, which implies narrow resonances which can therefore be more densely packed within a band. The Q factor represents the width of a resonance compared to its centre frequency, but is also proportional to the ratio of the total energy stored to the energy dissipated in a system, i.e.

$$Q = \frac{f_c}{\Delta f} = 2\pi \frac{W_{stored}}{W_{lost}}$$

The two primary loss mechanisms, which will reduce the Q factor, are dissipative losses and radiative losses. It is the former, which is due to conductive (metal) and dielectric losses inherent to the materials used, that has a detrimental effect on tag performance as it may result in broader peaks which may interfere with one another. Therefore, the selection of materials used may determine the maximum value of K, and therefore the maximum number of tags that can be uniquely identified.

Figure 12:
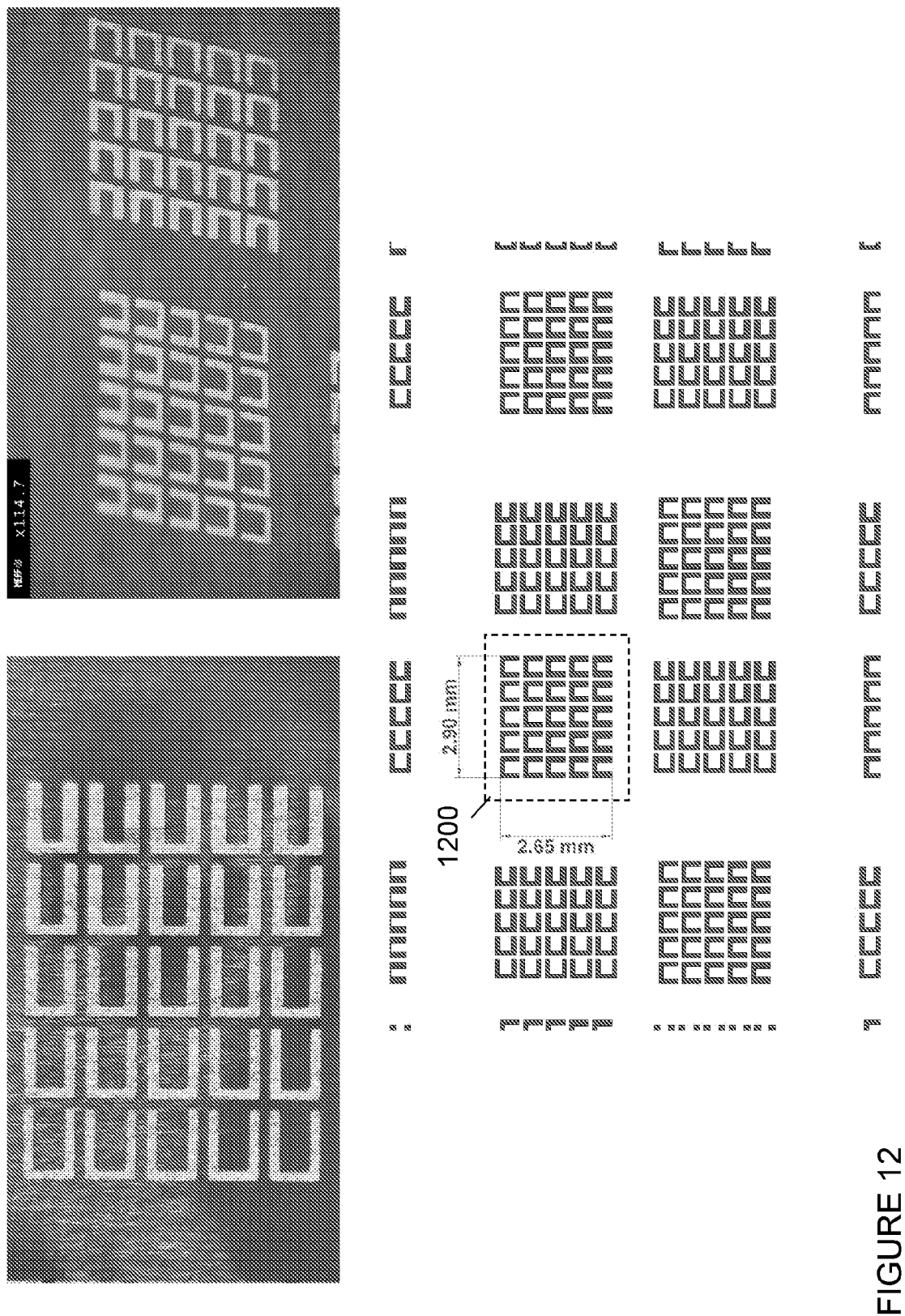
FIG. 12 shows the metamaterial tag design.
Figure 13:
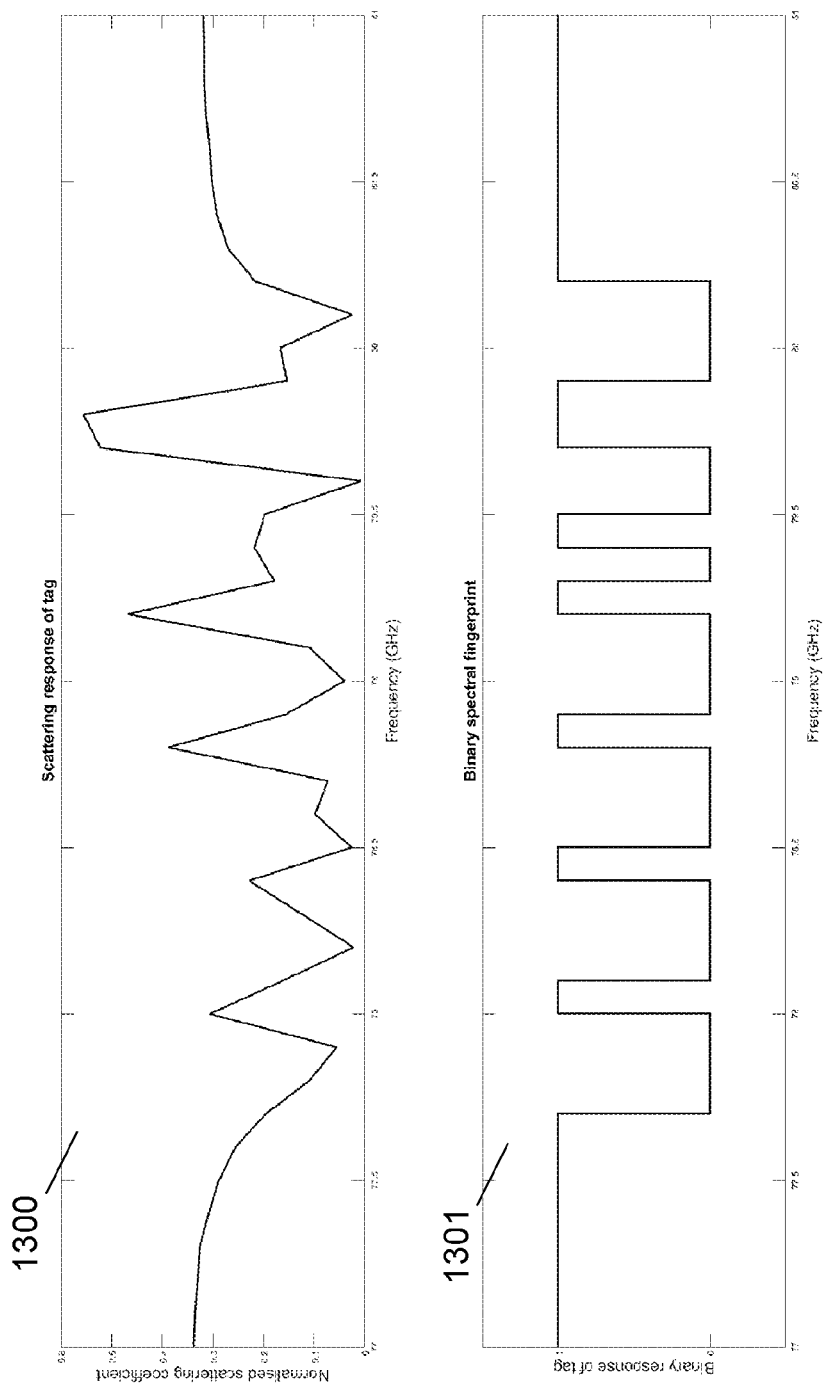
FIG. 13 shows the spectral fingerprint of a passive chipless tag. A scattering profile is detected by the mmWave radar, and is then converted to a binary spectral fingerprint.

FIG. 12 shows a meta-atom, and an example of a meta-material tag composed of 5×5 arrays of meta-atoms. The arrays are rotated (for polarisation symmetry), then translated across the tag. Each 5×5 array has dimensions 2.90 mm×2.65 mm, which is slightly smaller than a wavelength per side. A single meta-atom on its own, although much smaller than a wavelength, is designed to resonate within the appropriate band, in much the same manner as an L-C resonator would, which results in a dipole-like resonance. As the radar wave is incident on the tag surface, it excites the different meta-atoms and thus the spectral fingerprint of the tag. Fingerprint identification is performed through comparison of the frequency bins across the mmWave radar's band. This may be performed by: (i) identifying a narrow-band bandpass filter centred at the range bin (from the range FFT) of the scattered object, followed by application of the window function of the filter in the time domain to the captured IQ data (multiple chirps with K ADC samples per chirp) from the ADC, followed by noise mitigation through averaging data across the chirps, which results in K samples representing the spectral fingerprint. Alternatively: (ii) setting a reduced chirp bandwidth (e.g. BW/256 where BW is the total bandwidth of the mmWave radar, 4 GHz in the presented implementation) which represents a scan for a single frequency bin, then running a chirped sweep across the reduced bandwidth, and following the radar acquisition procedure to determine the range FFT, then recording the FFT magnitude for the relevant scattered object range, then repeating the procedure by increasing the starting frequency of the chirp to acquire the range FFT magnitude for the next bin. The combination of the FFT magnitudes will provide the relevant scattering profile for fingerprinting, although note that in this second scenario there would be performance limitations as the reduced bandwidth results in a reduction in range resolution. Dependent on the use case, the system can sense the location of tags to sub-mm accuracy by monitoring phase shifts (for short-range applications, such as heart rate monitoring of a user in front of the radar), or cm accuracy (for room-level detection). An example of the spectral fingerprint of a tag is shown in FIG. 13, in which the scattering profile is measured and normalised (1300), and then converted to binary form by comparing the amplitude of the normalised response to a pre-determined threshold value. This binary spectral fingerprint can subsequently be used to identify the tag.

2.3. Active Tags

Alternatively, if it is desirable to track greater numbers of targets, or if transmission of information from tag to anchor is desirable, then active tags may also be used following the hybrid approach described in Section 1.4.

3. Tagless Tracking

The use of mmWave radar also enables tracking of tagless scatterers, which can be used as an alternative monitoring system, presenting a further use of RTLS technology. The system presented is capable of tracking scatterers with a range of sizes, from the millimetre-scale to the metre-scale; as this can include untagged scatterers, further use cases are opened up, wherein tag-use is not suitable, or when motion by untagged objects (such as intruders) is detected, or when detection of a tag on a tagged object is lost (for example if a tag is blocked or broken). Furthermore, the tracking of Doppler characteristics and scattering response (such as FFT magnitudes and phases) allows some level of identification of the targets, and distinction between targets.

The primary use-case for this application is in conjunction with the virtual walls described in Section 1.3, particularly in out-patient wards when bed availability is tracked, but patients may not necessarily be tagged. In this scenario, of primary benefit is the detection of motion with respect to the partitioned areas. However, scattering characteristics (FFT magnitude in particular) can be used to distinguish between objects, such as between a ward bed (large magnitude) and a person (smaller magnitude), moving within an area.

An alternative use-case is monitoring of movement, even when tags are in use. An example could be in a ward or neo-natal unit; although staff and patients would be tagged, detection of motion by untagged scatterers could trigger an alarm indicating a possible intruder.

A common issue with current systems is loss of signal from a tag (e.g. if an IR tag loses line-of-sight), and so another use-case involves tracking when a tag has been blocked or broken. For example, if a patient's tag has been damaged, or has been covered such that there is loss of detection, the system continues to detect a scatterer with similar scattering magnitude at the tag's last known location, which would correspond to the patient. Therefore an alarm can be raised via the control centre, to local staff, indicating that the patient's tag is no longer detected, while also live-tracking the patient's current location.

These presented applications of tagless tracking exhibit potential use-cases, which are not an exhaustive list of all possibilities.

4. Application of RTLS to Healthcare Delivery

The RTLS system presented provides resolutions to the nearest bed space and offers a plethora of applications that can improve healthcare delivery. The solution provides plug and play capabilities. Further, the sensing units can be mounted in small standalone devices without expensive installation costs. This makes them much more attractive than current technology which must be ceiling mounted and involves closing wards during installation work.

As an example, one sensing unit per room allows for scanning all present tags, sending real-time location information back to central database for processing and access by users.

Some use cases are presented below, but are not limited to:

Case 1. Tracking Assets—to identify location of objects/equipment (both high value e.g. renal dialysis machines and lower value e.g. infusion pumps) to be used in conjunction with workflow software to improve efficiency, utilisation, and to reduce total asset requirement. As an example, we present the savings of staff time resultant from tracking of infusion pumps. Infusion pumps are used through a hospital, and frequently a ward or department may not have an available pump, in which case one must be located from another ward. The traditional (and time-costly) approach has been to telephone other wards to locate an available pump, and when one is found to be available a nurse would then go to collect it; this costs significant staff time, both through possibly numerous phone calls and also through the time the nurse has spent travelling to and from the location of the available pump (which may not always be the nearest). A tracking RTLS system provides a real-time location of all available pumps and could also provide a decision on which pump could most quickly be obtained. This could provide considerable savings of nursing time.

Case 2. Tracking patients/service users—Identifying patient location to enable care providers to find them quickly and deliver healthcare or other services (e.g. porters to move patients, allocation of beds for patients after surgery).

Case 3. Tracking staff—to identify staff location for use in documenting care delivery (e.g. number of hours of bedside care delivered per day), improving efficiency, utilisation and service delivery.

Case 4. Improving staff safety—to be used in conjunction with alarm systems to communicate precise indoor location of staff at risk of assault or unsafe environment.

Case 5. Track and supporting vulnerable patients—to identify location of patients who are at risk of becoming lost (e.g. Children, patients with dementia/confusion).

Case 6. Patient fall detection—identification of falling by detection of rapid downward deceleration and subsequent immobility.

Case 7. Detection of patient movements—observations of movements of patient based on movements of patient (without tags) e.g. detection of breathing (a) directly by movement of chest wall relative to sensors and (b) relative movements of multiple tags on chest wall.

Case 8. Tracking therapy delivery and uptake—by identifying patient movement over time and documenting compliance and concordance with therapies (e.g. walking/physiotherapy).

Case 9. Hand-hygiene improvement—by tracking proximity to washbasins and hand sanitizer units as a proxy measure for handwashing.

Case 10. Infection risk identification, infection control and contact tracing—identify historic contact between staff and patients, to identify individuals exposed to infectious patients/staff and drive infection control processes (e.g. people to be treated with prophylaxis/quarantined (critical to understand proximity within a and duration of exposure and to establish risk).

Case 11. Bed use and cleaning—by tracking patients and beds in to identify when a bed has been vacated (based on vacant period or patient tag arrival in a discharge location) this can be used in conjunction with workflow software to trigger bed cleaning and bed allocation.

Case 12. Positioning autonomous devices—As an input for guidance systems for autonomous medical devices (e.g. motorised beds, cleaning devices, transport trolleys, etc.) by positioning tags at reference/beacon locations and integrating detectors into autonomous devices.

Case 13. Deployment and wayfinding of staff—identify and allocate nearest staff to perform a task, provide location information for navigation tools.

Case 14. Provide wayfinding information for patients—identify patient location based on tag and provide inputs for navigation tools.

Although the methods and systems have been described in the context of healthcare application/RTLS hospital tracking, the technology can be considered in other industry such as warehouse tracking, instrumentation monitoring, retail tracking, robotics localisation and tracking.

Appendix: Key Features

This section summarises the most important high-level features (A->G); an implementation of the invention may include one or more of these high-level features, or any combination of any of these. Note that each high-level feature is therefore potentially a stand-alone invention and may be combined with any one or more other high-level feature or features or any of the 'optional' features; the actual invention defined in this particular specification is however defined by the appended claims.

A. Millimetre Wave RTLS System

MmWave RTLS (Real-Time Location Sensing) system for detecting the presence of one or more objects, the system including multiple anchors, in which each anchor includes a mmWave radar subsystem that uses radar algorithms to detect one or more location-based objects characteristics.

Optional features in an implementation of the invention include any one or more of the following:

The location-based object characteristics include one or more of the following: range, direction-of-arrival, velocity, absolute position, or logical position, each determined relative to one or more anchors.

Location-based objects characteristics are tracked as a function of time and are associated with a timestamp.

Location-based objects characteristics are measured at predetermined time intervals.

Radar algorithms include MIMO (Multiple-Input Multiple-Output) radar algorithms.

Each anchor includes a communication module that communicates with a control centre including a database that receives and stores data from all anchors.

Communication module transmits location-based objects characteristics to the control centre, such as every minute or every 5 minutes.

Communication module communicates with the control centre via Bluetooth or WiFi or other wireless techniques.

Communication module is a standard or commodity cellular communications module using a standard interface such as 5G device-to-device protocols.

The control centre includes a control processing subsystem that analyses location-based objects characteristics from all anchors.

The control centre wirelessly transmits information from the analysed data with the different anchors.

The control centre wirelessly transmits information from the analysed data to end-users, such as on an application running on a connected device.

Each anchor is positioned such that it monitors a specific area or sub-area.

Each anchor transmits the characteristics of the detected objects via Wi-Fi to an external database.

Each anchor includes: (i) a first antenna array that transmits a plurality of mmWave signals, wherein the mmWave signals are chirped to encompass a plurality of frequencies across a large bandwidth; (ii) a second antenna array for receiving the backscattered mmWave signals;

Each anchor includes a digital front-end subsystem configured to generate the plurality of mmWave signals.

Each anchor includes an RF/analogue subsystem that is configured to
(i) process and transmit the plurality of mmWave signals through the first antenna array,
(ii) receive the backscattered signals through the second antenna array,
(iii) mix the transmit and receive signals through quadrature mixers, to obtain a complex I and Q signals at an intermediate frequency (IF) band, and (iv) filter the mixed signals through a bandpass filter, and (v) output the filtered and mixed signals for baseband processing.

The digital front-end subsystem is also configured to digitise the outputted signals for further processing;

Each anchor includes a processing subsystem configured to analyse the amplitude and phase of the outputted signals using radar signal processing techniques, in order to detect the presence of one or more objects, and to determine the characteristics of one or more objects in the vicinity of the anchor unit.

Object is tagged or untagged.

Detected object characteristics include identification (ID) number.

Object is moving.

Object is a human.

Each anchor includes an internal memory in which the detected object characteristics are stored.

The system's bandwidth of operation is: 76-81 GHz frequency range.

Tag is passive.

Tag is active.

The system achieves cm-level location accuracy.

The system can also detect sub-millimetre movements of detected objects by measuring the phase changes of the received signals.

Tagless objects are detected by measuring their scattering profiles.

B. Plug and Play Millimetre Wave RTLS System

Millimetre wave RTLS (Real-Time Location Sensing) system for detecting the presence of one or more objects, the system including multiple anchors, in which each anchor includes a mmWave radar subsystem that uses radar algorithms to detect one or more objects and determine location-based objects characteristics; and in which the system has plug and play capabilities, wherein each anchor can be plugged into a wall outlet, such as an AC outlet.

C. RTLS System for Detecting One or More Chipless Tags

RTLS (Real-Time Location Sensing) system for detecting the presence of a tag, the system including multiple anchors, in which each anchor includes a mmWave radar subsystem that uses radar algorithms to detect a tag and determine the tag characteristic such as: range, direction-of-arrival, velocity, spectral fingerprint, and identification number, and in which the tag is a chipless tag.

Optional features in an implementation of the invention include any one or more of the following:

RTLS system operates in the mmWave range.

The chipless tag has a spectral fingerprint encoded by its geometry.

Spectral fingerprint is determined by: (i) determining range of a scatterer from a range FFT, then; (ii) identifying and constructing a bandpass filter at this range, which is subsequently used to window the captured IQ data in the time domain; (iii) averaging the data over the total number of chirped frames, to mitigate for noise, with the averaged data giving the spectral fingerprint.

Spectral fingerprint is determined by sweeping a multitude of narrowband chirps, which in conjunction provides the spectral fingerprint across the entire frequency band of operation, as follows: (i) setting a reduced chirp bandwidth which represents a scan for a single frequency bin; (ii) performing a range FFT over this reduced bandwidth; (iii) recording the FFT magnitude for the distance corresponding to the tag, which gives the spectral response for this frequency bin; (iv) repeating the procedure for the next frequency bin. The combination of data for all frequency bins will give the spectral fingerprint of the tag.

D. Hybrid RTLS System Comprising of a Millimetre Wave Radar and a Secondary RF Tag Location Sensing System Hybrid RTLS (Real-Time Location Sensing) system for detecting the presence of a tag, the system including multiple anchors, in which each anchor includes:

(i) a primary tracking system including a mmWave radar system, which uses radar algorithms to detect a scatterer and determine the range and direction-of-arrival (i.e. 3D coordinates), and velocity of the scatterer, each determined relative to one or more anchors;

(ii) a secondary tracking system operating at a secondary band with a secondary protocol that is used to detect a tag and to determine a first estimate of the location of the tag;

in which the system includes a processing subsystem that synchronises and processes the data from the primary and secondary tracking system, and determines if the detected tag corresponds to the detected scatterer, providing a second location estimate of the tag which is more accurate than the first estimation when the detected tag correspond to the detected scatterer.

Optional features in an implementation of the invention include any one or more of the following:

the data from the primary and secondary tracking system are synchronised through comparison of corresponding timestamps.

The primary tracking system operates within the 77-81 GHz frequency range.

The secondary protocol is one of the following: UHF RFID or Bluetooth Low Energy {BLE} beacons or Wi-Fi Positioning System {WiPS}.

Tags operate in UHF (400 MHz or 900 MHz) or 2.4 GHz or 5 GHz.

The system does not include IR tracking technologies.

Off the shelves tags are used.

Tag includes a transmitter and an antenna capable of transmitting identifying information subject to the relevant protocol used (e.g. Wi-Fi or BLE);

Tag includes a memory chip for storage of encoded identification code;

Tag includes a battery.

Tag includes wearable sensors that monitors patient vital signs or environmental conditions.

Tag includes sensors that monitors an object such as an asset activity.

Tag includes a memory chip for storage of encoded identification code and for buffering data for transmission;

E. Plug and Play RTLS that Creates Virtual Walls Via a Software Module

An RTLS system for detecting the presence of multiple objects, wherein the system includes multiple anchors, in which each anchor includes a radar subsystem that uses radar algorithms to detect an object and to determine location-based objects characteristics, and in which each anchor is responsible to scan a specific sub-area, in which the sub-areas are defined by 'virtual walls' that have been generated by a software module, and in which each anchor is programmed to (i) monitor objects that are within their specific sub-area or (ii) ignore objects that are within their specific sub-area or (iii) monitor objects that cross their specific sub-area.

Optional features in an implementation of the invention include any one or more of the following:
'virtual walls' are created manually by a user via a web-browser or an application.
System does not include IR tracking technologies.
RTLS system operates in the mmWave range.
Virtual walls are defined to partition a room into multiple sections, in which one anchor is used per section.

F. Tagless Tracking

An RTLS system for detecting an untagged scatterer, wherein the system includes multiple anchors, in which each anchor includes a radar subsystem that uses radar algorithms to detect an untagged scatterer and to determine location-based objects characteristics, and in which the system is configured to track the untagged scatterer.

Optional features in an implementation of the invention include any one or more of the following:
Tracking is implemented with or without 'virtual walls'.
RTLS system operates in the mmWave range.
Tagless tracking is a function within an RTLS system that includes tagged tracking.
System configured to respond to detected motions of untagged targets (such as by triggering an event based on a detected motion).

G. Millimetre Wave Tags

A mmWave tag that is used in the mmWave RTLS system described above.

Optional features in an implementation of the invention include any one or more of the following:
Tag does not include an integrated circuit, or 'chip' [chipless tag]
The tag includes a metamaterial structure, which is composed of a plurality of subwavelength conducting structures on a flexible dielectric substrate, in which each of the structures is tuned to resonate at a certain frequency within the band, and to which the plurality of structures as a whole will resonate at discrete frequencies within the band to create an identifying 'spectral fingerprint'. The resonances will respond as areas of extreme scattering, so that the anchor can detect those specific resonances for identification.
An example of one of these structures could be a split ring resonator, which is composed of a ring with a gap incorporated, in which the structure could be interpreted (to a first approximation) as an inductor (the ring) and a capacitor (the gap) in series which creates an LC resonator.
The size of the tag is less than 5 mm.
Metamaterial structure is composed of a conductor (e.g. copper) on a flexible dielectric.
Tag 'spectral fingerprint' is used to identify the user.
Tag is worn by the user on a wristband or a patch.
Tag is tattooed on the user.
Tag is sewed on fabric.
Tag is transparent.
Wherein the tag is composed of a plurality of scatterers, wherein said scatterers are electrically small (less than a quarter of the free space wavelength), and where the plurality of scatterers in conjunction present a spectral fingerprint, the spectral fingerprint: (i) represents varying responses to the plurality of frequencies across the scanned bands, (ii) represents high or low scattering cross sections across the plurality of frequencies, (iii) can be detected to uniquely identify the tag;

H. Use Cases

Method of real-time detection and tracking of patient or staff or asset within a hospital environment using the mmWave RTLS system described above.

Optional features in an implementation of the invention include any one or more of the following:
The object is a patient or staff or asset within the hospital environment.
The method is used for the specific use cases (Cases 1-14) described in Section 4.
The control center is directly linked to hospital information systems (e.g. Patient Administration Systems, Hospital Management Information Systems).
Hospital staff is able to visualise the analysed data on a web browser or on an application running on a connected device or directly through the hospital information systems.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. An indoor mmWave RTLS (Real-Time Location Sensing) system for detecting the presence of one or more objects within an indoor environment, the system including multiple anchors, in which each anchor includes a mmWave radar subsystem that uses radar algorithms to detect one or more objects and determine one or more location-based object characteristics; and in which the indoor environment includes multiple rooms or sub-areas, and in which the system is configured to track the one or more objects across the multiple rooms or sub-areas;

and in which virtual walls are generated by a software module to define the multiple rooms or sub-areas such that the system is configured to: (i) monitor objects within the one or more sub-areas, (ii) ignore objects within the one or more sub-areas, or (iii) monitor objects crossing one or more virtual walls;

in which each anchor includes a MIMO (Multiple-Input Multiple-Output) system that includes a first antenna array and a second antenna array; in which (i) the first antenna array transmits a plurality of mmWave signals, wherein the mmWave signals are chirped to encompass a plurality of frequencies across a large bandwidth; and (ii) the second antenna array receives backscattered mmWave signals;

wherein the backscattered mmWave signals are: (i) mixed down to an IF band, (ii) processed through an ADC as I and Q signals to obtain complex IQ data, (iii) processed through a first FFT to generate a range profile, (iv) processed through a second FFT to generate a velocity profile, (iv) processed through a direction-of-arrival beamforming algorithm to generate azimuth angle and elevation angle profiles.

2. The indoor mmWave RTLS system of claim 1 in which the location-based object characteristics include one or more of the following: range, direction-of-arrival, velocity, absolute position, or logical position, each determined relative to one or more anchors.

3. The indoor mmWave RTLS system of claim 1, in which the location-based object characteristics are tracked as a function of time and are associated with a timestamp.

4. The indoor mmWave RTLS system of claim 1 in which the location-based object characteristics are measured at predetermined time intervals.

5. The indoor mmWave RTLS system of claim 1, in which the system further includes a control centre and each anchor includes a communication module that communicates with the control centre including a database that receives and stores the location-based object characteristics from all anchors, and in which the control centre includes a control processing subsystem that analyses location-based object characteristics from all anchors.

6. The indoor mmWave RTLS system of claim 5, in which the communication module communicates with the control centre via Bluetooth or WiFi or other wireless techniques.

7. The indoor mmWave RTLS system of claim 5, in which the control centre wirelessly transmits information from the analysed data to end-users, such as on an application running on a connected device.

8. The indoor mmWave RTLS system of claim 1, in which each anchor is positioned such that it monitors a specific area or sub-area.

9. The indoor mmWave RTLS system of claim 1, in which each anchor includes a digital front-end subsystem configured to generate the plurality of mmWave signals.

10. The indoor mmWave RTLS system of claim 1, in which each anchor includes an RF/analogue subsystem that is configured to
 (i) process and transmit the plurality of mmWave signals through the first antenna array,
 (ii) receive the backscattered signals through the second antenna array,
 (iii) mix the transmit and receive signals through quadrature mixers, to obtain a complex I and Q signals at an intermediate frequency (IF) band, and
 (iv) filter the mixed signals through a bandpass filter, and
 (v) output the filtered and mixed signals for baseband processing; and in which the digital front-end subsystem is configured to digitise and further process the output of the RF/analogue subsystem.

11. The indoor mmWave RTLS system of claim 10, in which each anchor includes a processing subsystem configured to analyse the amplitude and phase of the digitised signals using radar signal processing techniques, in order to detect the presence of one or more objects, and to determine the characteristics of one or more objects in the vicinity of the anchor unit.

12. The indoor mmWave RTLS system of claim 1, in which tagless objects are detected by measuring their scattering profiles and/or Doppler characteristics.

13. The indoor mmWave RTLS system of claim 1, in which the system's bandwidth of operation encompasses a band that lies within the 30-300 GHz frequency range.

14. The indoor mmWave RTLS system of claim 1, in which the system is configured to achieve cm-level location accuracy.

15. The indoor mmWave RTLS system of claim 1, in which the system is configured to detect sub-millimetre movements of detected objects by measuring the phase changes of the received backscattered signals.

16. The indoor mmWave RTLS system of claim 1, in which the system is configured to have plug and play capabilities, wherein each anchor can be plugged into a wall outlet, such as an AC outlet.

17. The indoor mmWave RTLS system of claim 1 in which each anchor is responsible to scan a specific sub-area.

18. The indoor mmWave RTLS system of claim 17, in which the 'virtual walls' are created manually by a user via a web-browser or an application.

19. A method of tracking an object using the indoor mmWave RTLS system as defined in claim 1.

20. The method of claim 19, in which the method is implemented in a hospital environment and the object is a patient or a staff or an asset within the hospital environment.

21. The indoor mmWave RTLS system of claim 1, in which the system is configured to alert an end-user when a sub-area has been unoccupied for a duration that is higher than a predefined threshold.

22. The indoor mmWave RTLS system of claim 1, in which the system is configured to count the number of objects entering a sub-area and remaining within the sub-area for a duration that is higher than a predefined threshold.

23. The indoor mmWave RTLS system of claim 1, in which the system is configured to count the number of objects crossing a virtual wall.

\* \* \* \* \*